United States Patent
Brown et al.

(10) Patent No.: US 9,187,169 B2
(45) Date of Patent: Nov. 17, 2015

(54) HIGH-WING-AIRCRAFT FUSELAGE SUPPORT STRUCTURE

(71) Applicant: The Boeing Company, Chicago, IL (US)

(72) Inventors: Stephen T. Brown, Seal Beach, CA (US); Sergey Barmichev, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 220 days.

(21) Appl. No.: 13/769,359

(22) Filed: Feb. 17, 2013

(65) Prior Publication Data
US 2014/0231586 A1 Aug. 21, 2014

(51) Int. Cl.
| B64C 1/00 | (2006.01) |
| B64C 1/26 | (2006.01) |
| B64C 1/06 | (2006.01) |
| B64C 1/18 | (2006.01) |
| B64C 25/12 | (2006.01) |

(52) U.S. Cl.
CPC . *B64C 1/26* (2013.01); *B64C 1/061* (2013.01); *B64C 1/065* (2013.01); *B64C 1/18* (2013.01); *B64C 2025/125* (2013.01)

(58) Field of Classification Search
CPC ........................................................ B64C 1/064
USPC ............................................. 244/117 R, 119
See application file for complete search history.

(56) References Cited

U.S. PATENT DOCUMENTS

| 1,840,902 | A | | 1/1932 | Hicks et al. | |
| 2,186,558 | A | | 1/1940 | Fernand et al. | |
| 2,407,480 | A | | 9/1946 | Dean et al. | |
| 3,901,465 | A | * | 8/1975 | DeAngelis | 244/48 |
| 3,980,257 | A | * | 9/1976 | Koch et al. | 244/218 |
| 4,484,721 | A | * | 11/1984 | Gue | 244/105 |
| 5,850,990 | A | * | 12/1998 | Gevers | 244/105 |
| 6,848,650 | B2 | * | 2/2005 | Hoisignton et al. | 244/13 |
| 7,891,608 | B2 | * | 2/2011 | Rawdon et al. | 244/119 |
| 8,210,466 | B2 | * | 7/2012 | Gygax | 244/13 |
| 8,387,917 | B1 | * | 3/2013 | Grip et al. | 244/119 |

FOREIGN PATENT DOCUMENTS

| DE | 102010044048 A1 | 5/2012 |
| EP | 2239195 A1 | 10/2010 |
| FR | 2935351 A1 | 3/2010 |

OTHER PUBLICATIONS

International Search Report for PCT/US2014/010361, dated Oct. 17, 2014.
International Preliminary Report on Patentability for PCT/US2014/010361, dated Aug. 18, 2015.

* cited by examiner

*Primary Examiner* — Brian M O'Hara
*Assistant Examiner* — Keith L Dixon

(57) ABSTRACT

A structural support assembly for a high-wing aircraft may include a plurality of columns extending through a passenger compartment of the aircraft having a pair of wings mounted proximate a top of a fuselage. A column upper end of at least one of the columns may be coupled to a center wing box structure adjacent to a rear spar thereof. A column lower end of at least one of the columns may be coupled to a floor substructure.

20 Claims, 15 Drawing Sheets

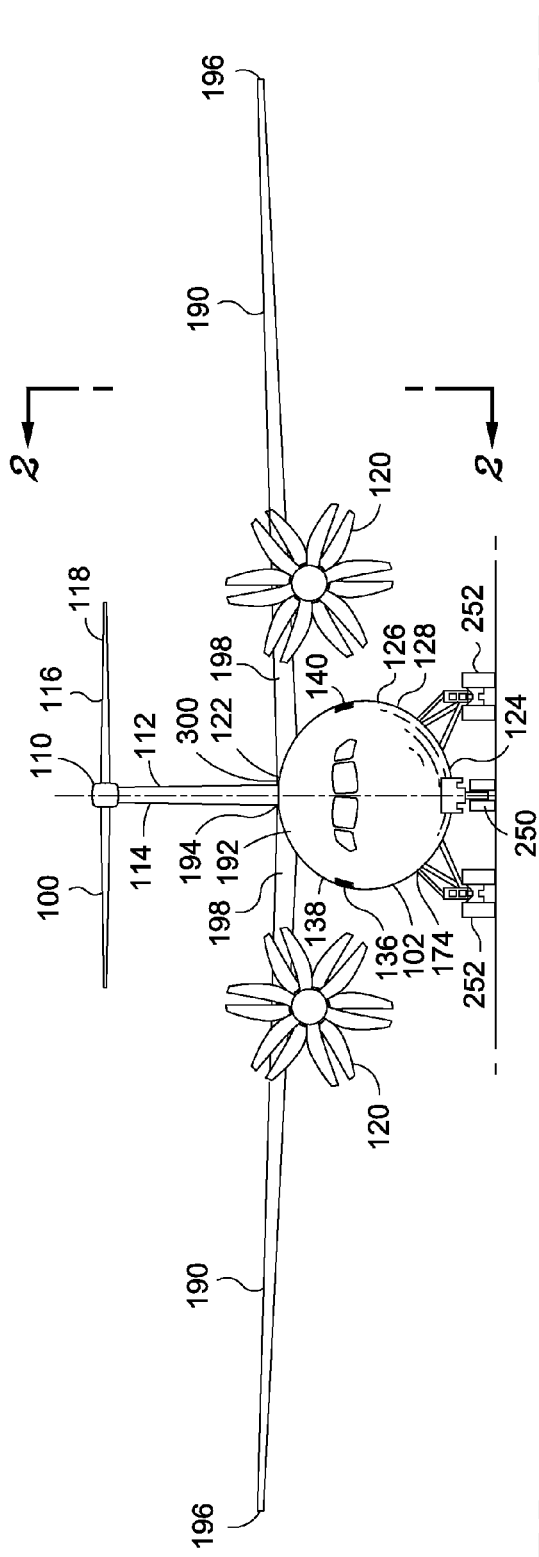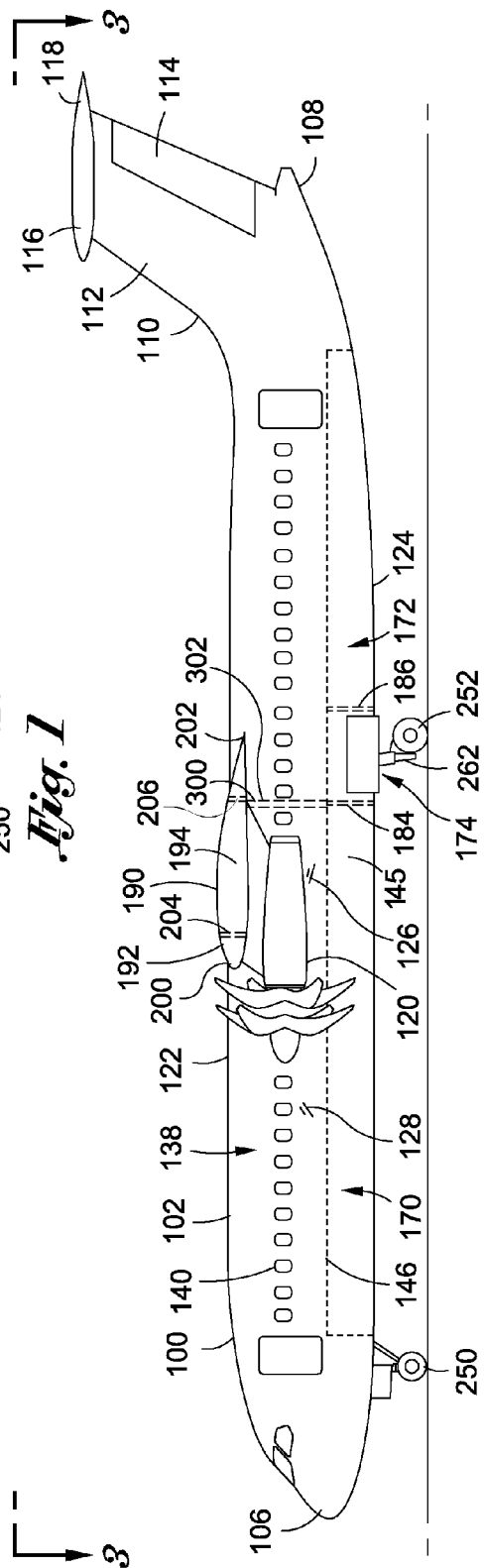

HIGH-WING-AIRCRAFT FUSELAGE SUPPORT STRUCTURE

FIELD

The present disclosure relates generally to aircraft structures and, more particularly, to a structural arrangement for supporting an aircraft wing.

BACKGROUND

Rising fuel costs and increasingly stringent environmental regulations such as carbon taxes are driving the development of aircraft propulsion systems with improved fuel efficiency. One aircraft propulsion system which is known to provide improved fuel efficiency and reduced carbon emissions is the open rotor propulsor. An open rotor propulsor is similar to a turbofan engine commonly used on commercial aircraft with the difference that an open rotor propulsor includes rotors that are external to the engine nacelle in contrast to a turbofan engine which includes one or more fans located inside the engine nacelle.

The rotors of an open rotor propulsor are larger in diameter than the nacelle of a turbofan engine and therefore require mounting at a higher location on the aircraft to provide ground clearance for the rotors. One solution to mounting open rotor propulsors at a high location is by supporting the propulsors on wings that are mounted to the top of the fuselage in a high-wing aircraft configuration. Unfortunately, mounting the wings on top of the fuselage requires a means for transferring the wing downward load down to the main landing gear which may be mounted toward the bottom of the fuselage. The wing downward load may include the structural mass of the wings and the mass of the open rotor propulsors, the fuel in the wing fuel tanks, and other systems that may be contained within or attached to the wings.

One approach to transferring the wing downward load into the main landing gear of a high-wing aircraft includes locally increasing the size of the fuselage frames in the area under the wings. For a fuselage having a cylindrical cross-sectional shape, the wing downward load must transfer from the top of the fuselage and down along the curved frames of the fuselage sidewalls and into the fuselage-mounted landing gear. Unfortunately, the curvature in the fuselage frames requires an increased height and/or thickness of the curved fuselage frames which results in the high-wing aircraft being generally heavier than a low-wing aircraft of approximately the same size.

Another approach to transferring the wing downward load into the main landing gear of a high-wing aircraft includes providing the fuselage in a square cross-sectional shape with straight sidewalls instead of a cylindrical shape with curved sidewalls. Straight sidewalls may transfer the vertical compression load of the wings into the main landing gear more efficiently than curved sidewalls. Unfortunately, a square fuselage may generate increased aerodynamic drag relative to a cylindrical fuselage. The increased aerodynamic drag of the square fuselage may reduce the aircraft fuel efficiency.

Yet another approach to transferring the wing downward load into the main landing gear of a high-wing aircraft includes adding a reinforcing bulkhead structure inside the aircraft cabin. Unfortunately, such a bulkhead structure displaces revenue-generating passenger seats and may require lengthening the fuselage to provide additional room for the displaced passenger seats. The lengthening of the fuselage may increase the total aircraft weight which may reduce the fuel efficiency of the aircraft.

As can be seen, there exists a need in the art for a system and method for transferring the wing downward load of a high-wing aircraft into a fuselage-mounted landing gear with a minimal increase in the weight of the aircraft. In addition, there exists a need in the art for a system and method for transferring the wing downward load of a high-wing aircraft into a fuselage-mounted landing gear which avoids the need to increase the length of the fuselage to accommodate a desired number of passenger seats. Ideally, the system and method may be integrated into a cylindrically-shaped fuselage to minimize aerodynamic drag.

SUMMARY

The above-noted needs associated with transferring the wing downward load of high-wing-aircraft into a fuselage-mounted landing gear are specifically addressed and alleviated by the present disclosure which provides a structural support assembly for a high-wing aircraft having a pair of wings mounted proximate a top of the fuselage. The structural support assembly may include a plurality of columns extending through a passenger compartment of the aircraft. A column upper end of at least one of the columns may be coupled to a center wing box structure such as adjacent to a rear spar of the center wing box structure. A column lower end of at least one of the columns may be coupled to the floor substructure of the aircraft.

In a further configuration, disclosed is a structural support assembly having one or more columns extending through the passenger compartment of a high-wing aircraft. The aircraft may have a pair of wings mounted proximate a top of the fuselage. A column upper end of at least one of the columns may be coupled to the wings such as to the center wing box structure. For example, one or more of the column upper ends may be coupled to a rear spar and/or to a structural rib of the wings and/or the center wing box structure. The column upper ends of at least one of the columns may be coupled to the center wing box structure proximate a vertical center of gravity of the wings. A column lower end of at least one of the columns may be coupled to the under-floor fuselage structure or floor substructure of the aircraft. For example, one or more of the column lower ends may be coupled to a wheel well forward bulkhead and/or to a cargo bay sidewall of the fuselage for transferring the wing downward load into the wheel well forward bulkhead. At least one of the columns may be positioned adjacent to one or more passenger seats.

Also disclosed is a method of supporting a wing of a high-wing aircraft. The method may include providing a fuselage having a wing mounted proximate a top of the fuselage and a main landing gear mounted toward a bottom of the fuselage. The method may further include extending a plurality of columns through an aircraft passenger compartment. In addition, the method may include coupling a column upper end of the columns to a center wing box structure adjacent to rear spar thereof. Furthermore, the method may include coupling a column lower end of the columns to the floor substructure, and transmitting a wing downward load through the columns, into the floor substructure and main landing gear.

The features, functions and advantages that have been discussed can be achieved independently in various configurations of the present disclosure or may be combined in yet other configurations, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a front view of a high-wing aircraft;

FIG. 2 is a side view of the high-wing aircraft of FIG. 1;

DETAILED DESCRIPTION

Figure 6:
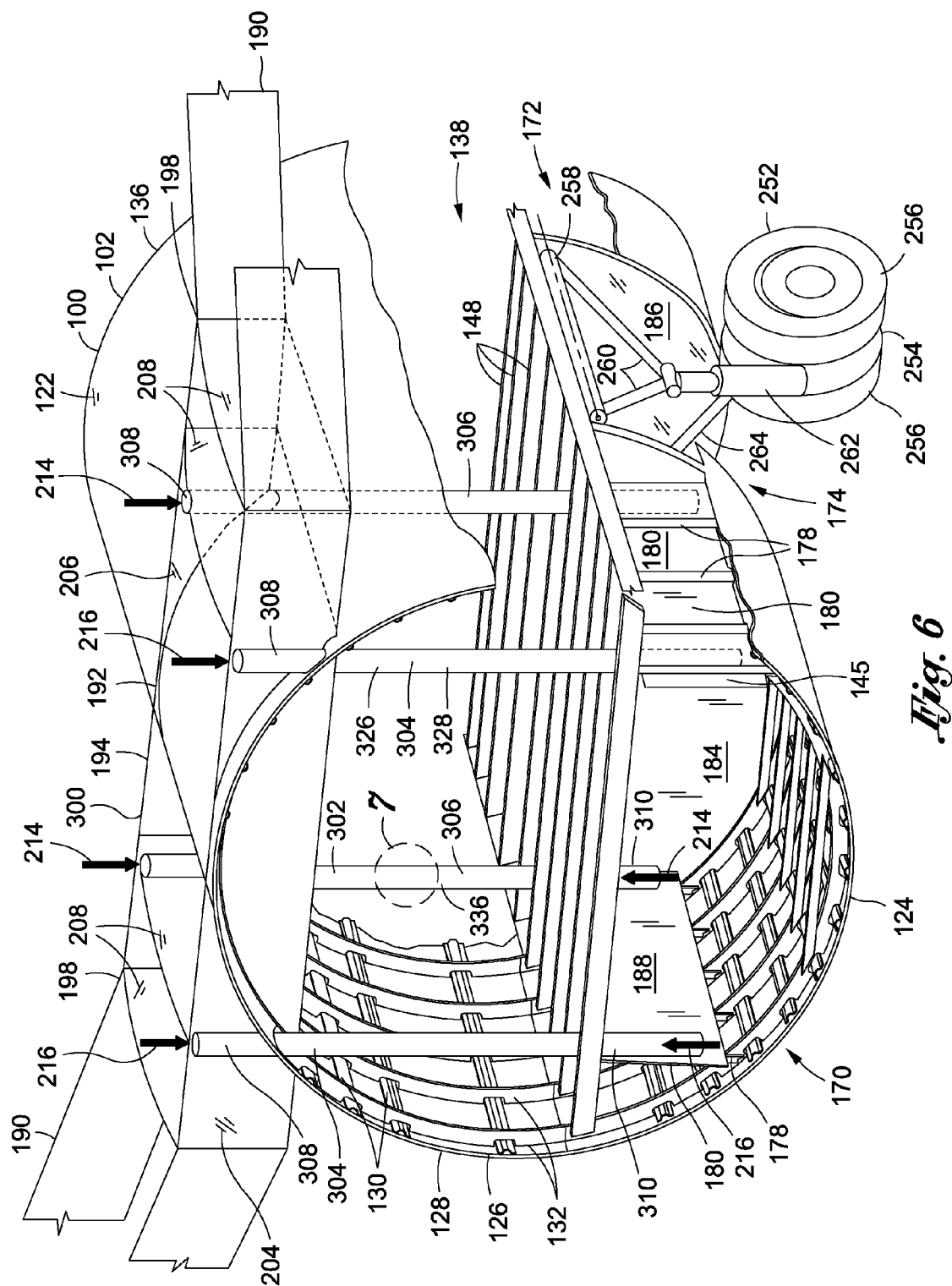
FIG. 6 is a perspective view of a configuration of the structural support assembly comprising a plurality of the vertically oriented columns for supporting the wing.

Referring now to the drawings wherein the showings are for purposes of illustrating preferred and various configurations of the disclosure, shown in FIGS. 1-2 is a high-wing aircraft 100. The aircraft 100 includes a fuselage 102 extending from a nose at a forward end 106 of the aircraft 100 to an empennage 110 at an aft end 108 of the aircraft 100. The empennage 110 may include one or more tail surfaces such as a horizontal stabilizer 116, an elevator 118, a vertical stabilizer 112, and/or a rudder 114 for directional control of the aircraft 100. The aircraft 100 may include a pair of wings 190 extending outwardly from the wing roots 198 at the fuselage 102 toward the wing tips 196. The wings 190 may be mounted to or positioned at a top or crown region 122 of the fuselage 102. Each one of the wings 190 may have a leading edge 200 and a trailing edge 202. The wings 190 may be joined together at a center wing box structure 194 (FIG. 6). The center wing box structure 194 may be coupled to the crown region 122 of the fuselage 102 at a wing-fuselage juncture 192.

In FIGS. 1-2, each wing 190 may include one or more propulsion units 120 that may be mounted to the wings 190 such as by means of pylons. Although the propulsion units 120 are shown as open rotor propulsion units 120 having counter-rotating rotor blades, the propulsion units 120 may be provided in alternative configurations such as a ducted turbofan configuration, a propeller-driven piston-engine configuration, or in other configurations. The wings 190 may include fuel tanks for supplying fuel to the propulsion units 120. In addition, the wings 190 may include various systems such as electrical systems, hydraulic systems, pneumatic systems, and aerodynamic systems such as lift control devices and control surfaces. The structural mass of the wings 190 may include the mass of the front spars 204, the rear spars 206, the wing ribs, the wing skins, the center wing box structure 194, and other primary and secondary load-carrying structures. The total mass of the wings 190 may include the structural mass of the wings 190 and the mass of the propulsion units 120, the fuel, and other above-mentioned systems.

In FIGS. 1-2, the fuselage 102 may have an approximately circular cross-sectional shape 136 although the fuselage 102 may be provided in any cross-sectional shape including, but not limited to, a square cross-sectional shape, an ovalized cross-cross-sectional shape, or any one of a variety of other cross-sectional shapes. In the configuration shown, the aircraft 100 may comprise a passenger aircraft having a passenger compartment 138 containing a plurality of passenger seats 150 (FIG. 4) and a plurality of windows 140. The passenger compartment 138 may be separated from one or more cargo bays 170, 172 that may be located below the passenger compartment 138.

In FIG. 2, the aircraft 100 may be supported by a nose landing gear 250 at the forward end 106 of the aircraft 100 and main landing gear 252 at an approximate mid-station of the aircraft 100. The fuselage 102 may include a floor substructure 145 which may comprise the structure of the fuselage 102 located at and below a floor panel 146 of the fuselage 102. The floor substructure 145 may define a forward cargo bay 170 and an aft cargo bay 172 which may be separated from one another by a wheel well 174. The wheel well 174 may be defined by a wheel well 174 forward bulkhead 184 and a wheel well 174 aft bulkhead 186. The forward bulkhead 184 and the aft bulkhead 186 may be included in the floor substructure 145. The main landing gear 252 may be retracted into the wheel well 174 such as when the aircraft 100 is airborne.

In the configuration shown in FIG. 2, the main landing gear 252 may be mounted to the fuselage 102 at a station location (i.e., at a forward-aft location) that is generally aligned with or aft of the rear spar 206 of the wings 190 at the center wing box structure 194. More specifically, the wheel well 174 forward bulkhead 184 may be generally vertically aligned with the rear spar 206 of the center wing box structure 194. Alternatively, the main landing gear 252 may be mounted to the fuselage 102 at a station location that is generally aft of the rear spar 206 of the center wing box structure 194, although the main landing gear 252 may be located at any station along the fuselage 102. Although the nose landing gear 250 and the main landing gear 252 are shown as being retractable into the fuselage 102, the nose landing gear 250 and/or the main landing gear 252 may be non-retractable or permanently fixed in the extended position.

As shown in FIG. 2, the aircraft 100 may advantageously incorporate a structural support assembly 300 as disclosed herein for transferring the wing downward load 212 (FIG. 4) to the floor substructure 145 and into the main landing gear 252 and/or the keel region 124 of the fuselage 102 as described in greater detail below. The wing downward load 212 on the fuselage 102 may comprise the above-mentioned total wing mass (i.e., the mass of the wing 190 structure, the propulsion units 120, the fuel, and other systems) under a negative or downward acceleration typically ranging from a negative 1-g loading to an even more negative loading due to a positive upward fuselage acceleration. For example, the structural support assembly 300 may be sized and configured to support the wing downward load 212 under an approximate 3-g wing downward load 212 on the fuselage 102 due to a positive upward fuselage acceleration such as may occur in the event of a hard landing. The structural support assembly 300 may be configured to support the wing downward load 212 with a safety factor applied to the positive upward fuselage acceleration. For example, the structural support assembly 300 may be configured to support the wing downward load 212 resulting from a positive 3-g upward fuselage acceleration with an applied safety factor of 1.5 for a total 4.5-g wing downward load 212 on the fuselage 102, as described in greater detail below.

In a configuration, the structural support assembly 300 may include one or more columns 302 (FIG. 2) extending from the center wing box structure 194 at the top of the fuselage 102 downwardly through the passenger compartment 138 and into the floor substructure 145. The columns 302 may be directly or indirectly coupled to the main landing gear 252. For example, FIG. 2 illustrates the column upper ends 308 (FIG. 4) being directly or indirectly coupled to the center wing box structure 194 structural rib 208 (FIG. 4) proximate a rear spar 206 thereof, and the column lower ends 310 (FIG. 4) being directly or indirectly coupled to the floor substructure 145 such as to the forward bulkhead 184 of the wheel well 174. Advantageously, the column(s) 302 of the structural support assembly 300 may transfer the wing downward load 212 from the top of the fuselage 102 down to the floor substructure 145 and into the main landing gear 252 in a manner that minimizes vertical loading of the fuselage sidewalls 126. In this manner, the columns 302 may minimize the weight increase in the fuselage 102 that would otherwise occur as a result of an increase in the size (e.g., frame depth, section thickness) of the fuselage frames 132 to transfer the wing downward load 212 through the curved fuselage sidewalls 126. Advantageously, the structural support assembly 300 minimizes the overall weight of the aircraft 100 with a resulting increase in aircraft fuel efficiency, range, climb rate, and/or other performance advantages, with a minimal impact on passenger seating.

Figure 3:
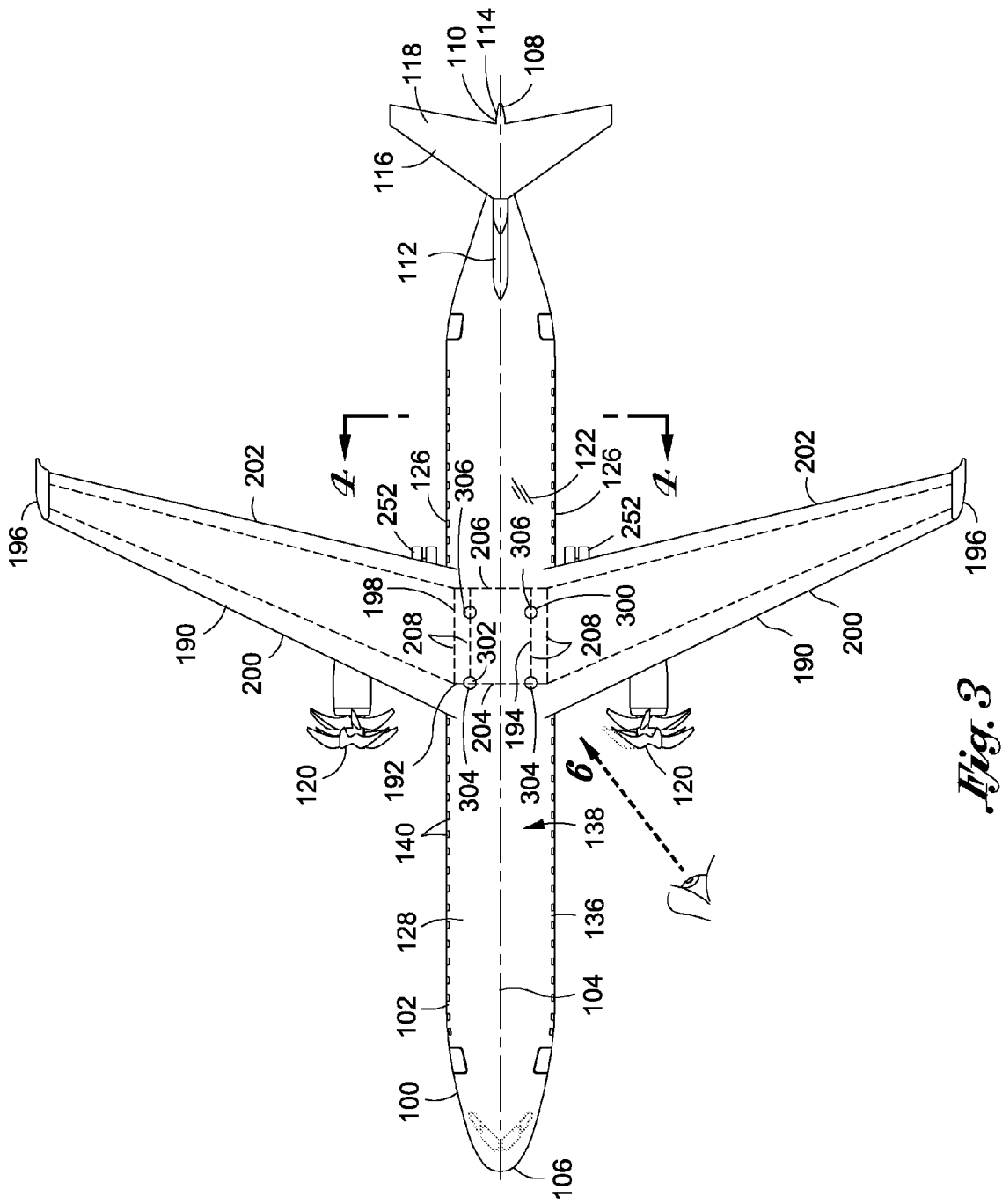
FIG. 3 is a top view of the high-wing aircraft of FIG. 1.

FIG. 3 is a top view of the aircraft 100 illustrating a configuration of the structural support assembly 300 having a plurality of the columns 302 coupled to the center wing box structure 194. In a configuration, the columns 302 may be symmetrically arranged in lateral pairs relative to a longitudinal axis 104 of the aircraft 100, although the columns 302 may be arranged in an asymmetric manner (not shown) relative to the longitudinal axis 104. The structural support assembly 300 may include a symmetric pair of aft columns 306 that may be coupled to the center wing box structure 194 proximate the rear spar 206 thereof. The structural support assembly 300 may also include a pair of forward columns 304 that may be coupled to the center wing box structure 194 proximate the front spar 204 thereof. In addition to or as an alternative to coupling the columns 302 to the front spar 204 and/or the rear spar 206, one or more of the columns 302 may be coupled to one or more structural ribs 208 of the center wing box structure 194. Although FIG. 3 illustrates four (4) columns 302 coupled to the center wing box structure 194, any number of columns 302 may be provided. In addition, the columns 302 may be coupled to any location on the wings 190, and are not limited to coupling to the center wing box structure 194.

Figure 4:
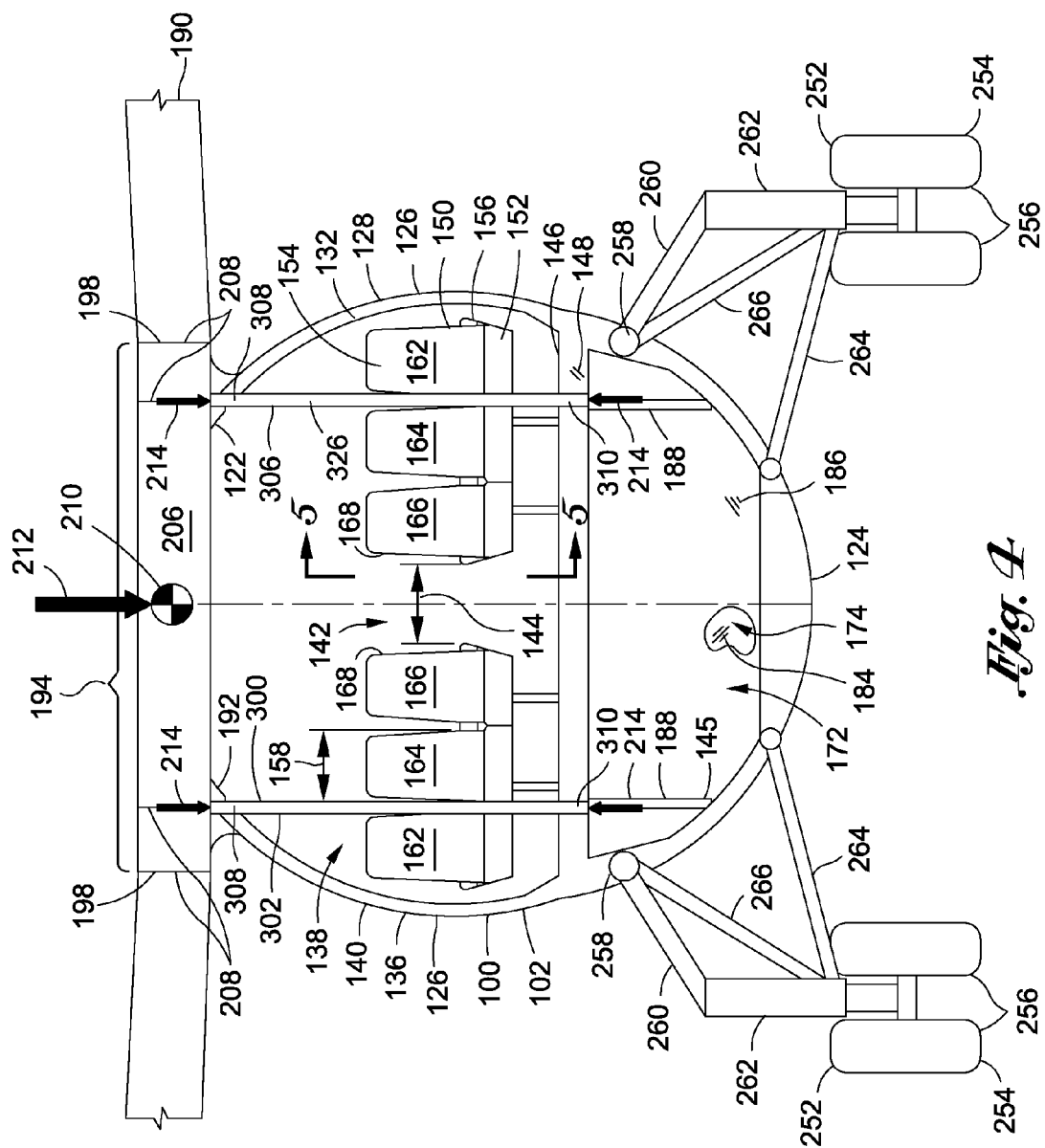
FIG. 4 is a sectional view of the aircraft fuselage taken along line 4 of FIG. 3 and illustrating a configuration of a structural support assembly comprising a plurality of columns for supporting a wing mounted proximate a top of the fuselage.

FIG. 4 is a sectional view of the aircraft 100 of FIG. 3 and illustrating the center wing box structure 194 located on the crown region 122 of the fuselage 102 and defining the wing-fuselage juncture 192. The center wing box structure 194 may be defined as the portion of the wing structure located between the wing roots 198 of the pair of wings 190 and may include a plurality of structural ribs 208 which may be generally oriented in a forward-aft direction although the structural ribs 208 may be oriented in any direction. The wings 190 may have a vertical center of gravity 210 along which the wing downward load 212 may act. The wing downward load 212 may impose a vertical compression load into the columns 302. The columns 302 may efficiently transfer a majority of the wing downward load 212 into the main landing gear 252 and thereby minimize peak compression loading of the fuselage sidewalls 126 during a negative vertical load from the wings 190 (i.e., a wing downward load 212) such as may occur during a hard landing. In this manner, the columns 302 advantageously minimize an increase in fuselage 102 weight that would otherwise occur due to an increased size and/or frame depth required of the curved fuselage frames 132 (FIG. 6) to transfer the wing downward load 212 through the fuselage sidewalls 126.

FIG. 4 illustrates a pair of the columns 302 extending substantially vertically through a single-aisle passenger compartment 138 of a fuselage 102 having an approximately circular cross-sectional shape 136. The columns 302 may pass through the floor panels 146. The column lower ends 310 may be coupled to the floor substructure 145 which may include a plurality of generally laterally-oriented floor beams 148 and/or a plurality of generally longitudinally-oriented floor beams (not shown). The opposing ends of the laterally-oriented floor beams 148 may be supported by the fuselage sidewalls 126. In addition, the floor beams 148 may be supported by a plurality of stanchion vertical beams 178 (FIG. 6) and/or stanchion wall panels 180 (FIG. 6) that may form the cargo bay sidewalls 188 (FIG. 6) extending upwardly from the keel region 124 (FIG. 6) of the fuselage 102.

In FIG. 4, the column lower ends 310 of one or more of the columns 302 may be coupled to the cargo bay sidewalls 188 and/or to the floor beams 148. The cargo bay sidewalls 188 and the floor beams 148 may be included in the floor substructure 145. The cargo bay sidewalls 188 and/or floor substructure 145 may transfer, via shearing, the compression load of the columns 302 into the wheel well 174 forward bulkhead 184 and into the main landing gear 252. The main landing gear 252 may be coupled to or supported by the forward bulkhead 184, the aft bulkhead 186, and/or the surrounding fuselage 102 structure. The cargo bay sidewalls 188 may also transfer the vertical compression load of the columns 302 into the keel region 124 of the fuselage 102 in the event of a gear-up landing as described below. The keel region 124, the keel beam 176, and the portion of the fuselage frames 132 and the skin member 128 located below the floor panel 146 may be included in the floor substructure 145.

Figure 5:
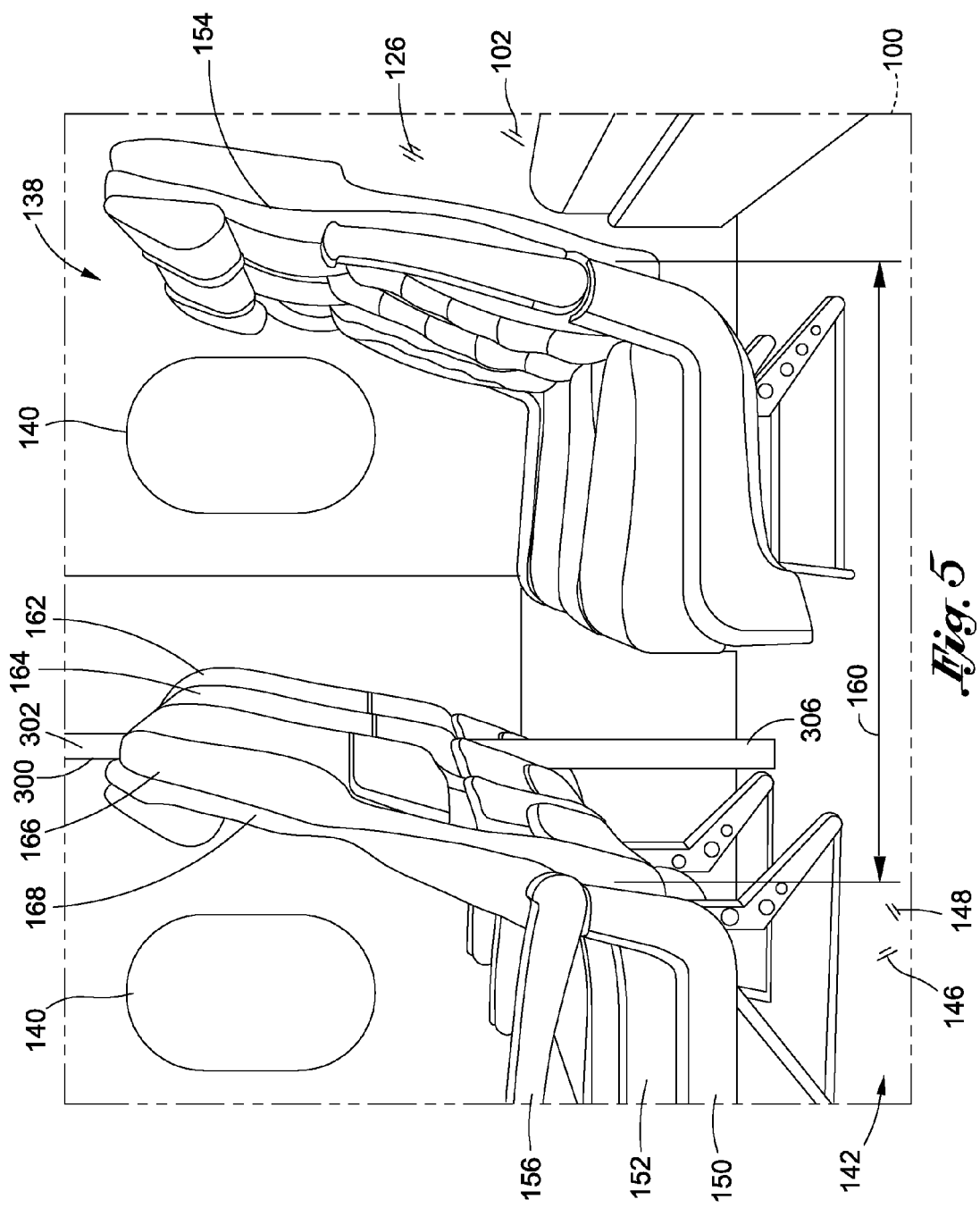
FIG. 5 is a side view of a passenger compartment of the aircraft of FIG. 3 and illustrating one of the columns extending downwardly through the passenger compartment.

In FIGS. 4-5, a pair of the columns 302 is shown extending through a single-aisle passenger compartment 138 of a narrow-body aircraft 100 having three (3) passenger seats 150 on each side of the aisle 142. However, the structural support assembly 300 disclosed herein may be implemented in a single-aisle passenger compartment 138 having one (1) passenger seat 150, two (2) passenger seats 150, and/or additional passenger seats 150 on one or both sides of the aisle 142. The structural support assembly 300 may also be implemented in a twin-aisle passenger compartment 138 (FIGS. 14-16—described below) of a wide-body aircraft, or in any other type of high-wing aircraft 100 configuration including a cargo (i.e., non-passenger) high-wing aircraft configuration (not shown). In this regard, the disclosed configurations may be applied to high-wing aircraft of any configuration, without limitation, including any civil, commercial, or military aircraft.

In the passenger compartment 138 shown in FIGS. 4-5, one or more of the columns 302 may be positioned between a pair of adjacently-disposed passenger seats 150 (e.g., side-by-side passenger seats) in a manner that minimizes the impact on passenger seating. For example, one of the passenger seats 150 may be a window seat 162 located adjacent to a fuselage sidewall 126 of the fuselage 102. The seat width 158 of the window seat 162 may be locally reduced to accommodate the column 302, and/or the seat width 158 of the adjacent seat (i.e., next to the window seat 162) may be locally reduced to accommodate the column 302 such that the aisle width 144 is maintained at a constant width along the length of the passenger compartment 138. However, the present disclosure contemplates maintaining all of the passenger seats 150 at a constant seat width 158 and laterally shifting one or more of the passenger seats 150 in a given row to provide space between passenger seats 150 to accommodate one or more columns 302 and which may result in locally reducing the aisle width 144 in such row.

FIG. 5 illustrates a column 302 positioned between a middle seat 164 and a window seat 162. The column 302 is shown generally aligned (i.e., in a forward-aft direction) with the seat back 154 of the passenger seats 150. The seat bottoms 152 are located generally forward of the column 302. In a configuration, the column 302 may be positioned directly aft of one or both of the arm rests 156 of the passenger seats 150 to minimize the impact on useable space for passengers seated in such passenger seats 150. The columns 302 may also be positioned such that the seat back 154 can recline aftwardly past the columns 302. The columns 302 may be positioned at a forward-aft location that minimizes the impact of the columns 302 on space for passengers seated in the passenger seats 150. The column 302 may be locally covered or encapsulated with padding 336 (FIG. 6) to conform to head-injury-criteria as may be imposed by a regulatory body such as the Federal Aviation Administration (FAA) as described below. It should be noted that although the columns 302 are illustrated as being substantially vertically-oriented, the present disclosure contemplates an arrangement wherein one or more of the columns 302 are non-vertically oriented (not shown).

FIG. 6 shows a configuration of a structural support assembly 300 integrated into an aircraft 100 and illustrating the interconnectivity of the columns 302, the wings 190, and the fuselage 102 in an arrangement for transferring the wing downward load 212 (FIG. 4) through the columns 302, into the floor substructure 145, and into the main landing gear 252. The center wing box structure 194 is schematically illustrated with primary structural components including the front spar 204, the rear spar 206, and several structural ribs 208 generally representative of the center wing box structure 194 although the center wing box structure 194 may be provided with any number of spars and any number of structural ribs 208 to which the columns 302 may be coupled. The structural support assembly 300 may include a pair of aft columns 306 and a pair of forward columns 304. At least one pair of the columns 302 may be located proximate the vertical center of gravity 210 (FIG. 4) of the wings 190.

The wing downward load 212 (FIG. 4) may result in a primary compression load 214 in the aft columns 306 and a secondary compression load 216 in the forward columns 304. The primary compression load 214 in the aft columns 306 may be larger than the secondary compression load 216 in the forward columns 304 due to the aft columns 306 being located closer to the vertical center of gravity 210 (FIG. 10) than the forward columns 304. For an aircraft 100 having a swept-wing planform as shown in FIG. 3, the vertical center of gravity 210 of the above-defined total wing mass may be located near or at the rear spar 206 of the center wing box structure 194. For a non-swept-wing planform aircraft (not shown), the vertical center of gravity 210 (FIG. 4) may be located generally midway between the front spar 204 and the rear spar 206 of the center wing box structure 194 and which may result in a more even distribution of the compression load between the forward and aft columns 304, 306.

In FIG. 6, the fuselage 102 is shown in a skin-stringer arrangement having a skin member 128 supported by a plurality of longitudinal fuselage stringers 130 and a plurality of circumferential fuselage frames 132. The fuselage stringers 130 may carry axial forces such as axial tension loads caused by internal cabin pressurization. The fuselage stringers 130 may also increase the buckling strength of the fuselage 102 under bending. The fuselage frames 132 may carry circumferential tension loads or hoop loads due to cabin pressurization and may generally maintain the shape of the fuselage 102. The fuselage frames 132 located under the wing may also transfer a portion of the wing downward load 212 into the main landing gear 252. The column upper ends 308 of the aft columns 306 may be coupled to one or more of the structural ribs 208 of the center wing box structure 194 and/or to the rear spar 206 of the center wing box structure 194. The column upper ends 308 of the forward columns 304 may be coupled to one or more of the structural ribs 208 and/or to the front spar 204 of the center wing box structure 194. In addition, any one of the columns 302 may optionally be coupled to the fuselage 102 structure including coupling the columns 302 to the skin member 128, the fuselage frames 132, and/or to the fuselage stringers 130. Although not shown, the column upper ends 308 of any one of the columns 302 may be indirectly coupled to the center wing box structure 194. For example, the column upper ends 308 of any one of the columns 302 may be coupled to the fuselage 102 which may in turn be coupled to the center wing box structure 194.

In FIG. 6, the fuselage 102 may include the floor substructure 145 which may comprise the floor panel 146 (FIG. 5) supported by a plurality of laterally-oriented floor beams 148 and/or a plurality of generally longitudinally-oriented floor beams 148 (not shown). The floor panel 146 may separate the passenger compartment 138 from the forward cargo bay 170 and the aft cargo bay 172. The opposing ends of the laterally-oriented floor beams 148 may be supported by the fuselage sidewalls 126. In addition, the floor beams 148 may be supported by a plurality of stanchion vertical beams 178 and/or stanchion wall panels 180 that may collectively form the cargo bay sidewalls 188 and which may also form the floor substructure 145. Although shown as being generally vertically-oriented, the cargo bay sidewalls 188 may be provided in any angular orientation. The cargo bay sidewalls 188 in the forward cargo bay 170 may be directly or indirectly (e.g., via the floor substructure 145) coupled to the wheel well 174 forward bulkhead 184. Although not shown, the aft cargo bay 172 may include cargo bay sidewalls 188 that may be directly or indirectly coupled to the wheel well 174 aft bulkhead 186.

The column lower ends 310 of one or more the columns 302 may be coupled to the cargo bay sidewalls 188 of the floor substructure 145. For example, the column lower ends 310 of the pair of forward columns 304 may be coupled to the cargo bay sidewalls 188 which may shear the secondary compression load 216 into the wheel well 174 forward bulkhead 184. The column lower ends 310 of the aft columns 306 may be generally vertically aligned (i.e., in a forward-aft direction) with the wheel well 174 forward bulkhead 184. In this regard, the column lower ends 310 of the aft columns 306 may be directly coupled to the wheel well 174 forward bulkhead 184. However, the column lower ends 310 of the aft columns 306 may be coupled to the cargo bay sidewalls 188 which may shear the primary compression load 214 of the aft columns 306 into the wheel well 174 forward bulkhead 184.

In FIG. 6, the main landing gear 252 may include a pair of truck assemblies 254 mounted on opposite sides of the fuselage 102 such as to the floor substructure 145. Each one of the truck assemblies 254 may include one or more wheels 256. For example, FIG. 6 illustrates a single-axle truck assembly 254 having dual wheels 256. However, for relatively heavy aircraft, the truck assemblies 254 may comprise multi-axle truck assemblies (not shown) including double-axle truck assemblies or triple-axle truck assemblies. The truck assemblies 254 may be supported by an oleo strut 262 or other suspension system for absorbing the impact of landing. Each truck assembly 254 may be coupled to the fuselage 102 by means of a trunnion 258 and one or more side braces 264, trunnion braces 260, and/or truss members 266 (FIG. 4) to stabilize the truck assembly 254 in the extended position. In the configuration shown, the trunnion 258 may be coupled to and may extend between the wheel well 174 forward bulkhead 184 and the wheel well 174 aft bulkhead 186. In addition, each trunnion 258 may be directly or indirectly coupled to the fuselage 102 structure such as the floor beams 148 and/or to one or more fuselage side beams (not shown) that may extend lengthwise along at least a portion of the fuselage 102 near the wheel well 174 on each side of the fuselage 102.

In FIG. 6, the compression load in the columns 302 may be transferred into the main landing gear 252 by means of the interconnection between the aft columns 306 and the wheel well 174 forward bulkhead 184 and the interconnection between the forward columns 304 and the cargo bay sidewalls 188, as mentioned above. In addition, the fuselage shell (i.e., skin member 128 and fuselage frames 132) may transfer a portion of the compression load into the main landing gear 252. For example, one or more of the fuselage frames 132 in the keel region 124 may transfer some of the shear load from the cargo sidewalls into the wheel well 174 forward bulkhead 184, the trunnions 258, and/or into other attach points where the main landing gear 252 is attached to the fuselage 102 such as via the attachment of the side braces 264 (FIG. 4) to the keel region 124 (FIG. 4) of the fuselage 102. In this regard, in a configuration, the structural support assembly 300 may be configured to cooperate with the fuselage 102 such that the columns 302 and the fuselage 102 may transfer substantially equal portions of the wing downward load 212 down to the main landing gear 252.

Figure 7:
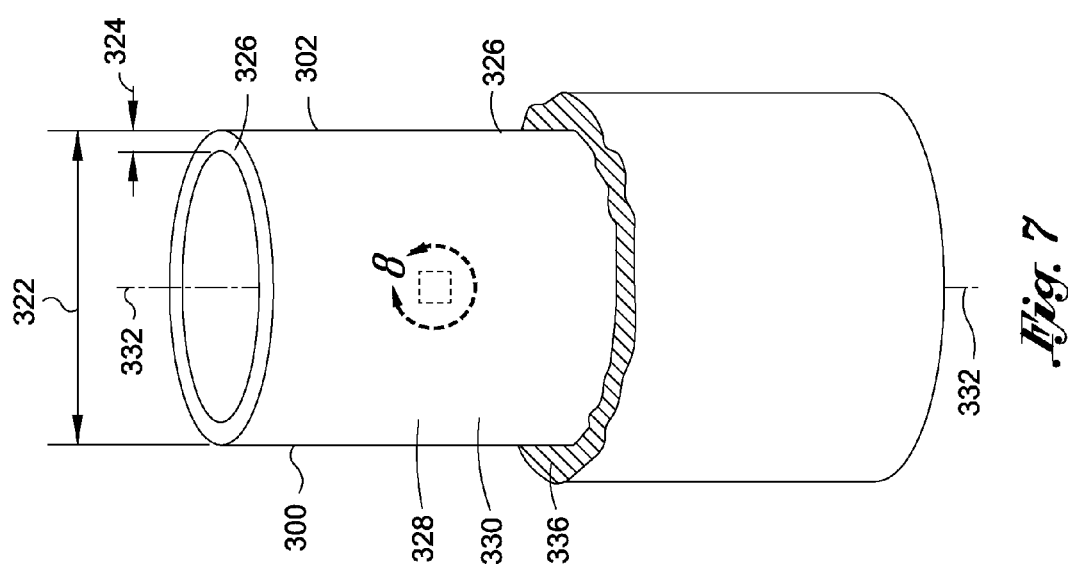
FIG. 7 is a perspective view of a portion of one of the columns which may be formed of composite material and which may be encapsulated by padding.

Referring to FIG. 7, shown is a portion of a column 302 in a configuration having a generally hollow cylindrical cross section although the column 302 may be provided in any hollow cross-sectional shape or non-hollow cross-sectional shape including, but not limited to, a square, rectangular, or other polygonal cross-sectional shape. As indicated above, the column 302 may be covered with a cushioning material such as foam padding 336 or other soft, elastomeric material for protection of passengers in the event of contact with the column 302. In a configuration, padding 336 may be applied to portions of the columns 302 that are susceptible to contact by passengers. The padding 336 may be configured to conform to head-injury criteria as may be specified by an aviation regulatory agency.

In FIG. 7, each column 302 may be formed of a metallic material and/or a non-metallic material and which may have a relatively high compressive load-carrying capability. For example, the columns 302 may be formed of aluminum, steel, titanium or other metallic material. In a configuration, the columns 302 may be formed of composite material 326 such as fiber-reinforced polymer matrix composite material 326 having a relatively high compressive strength capability. The fiber-reinforced polymer matrix composite material 326 may allow each column 302 to be provided in a relatively small column width 322 which may minimize the impact of the columns 302 on the seat width 158 (FIG. 4) and/or the aisle width 144 (FIG. 4) inside the passenger compartment 138 (FIG. 4). The columns 302 may be hollow with a wall thickness 324 that, in combination with the column width 322, provides buckling stability to the columns 302. In this regard, the composite material 326 system may be configured for resistance against lateral buckling under the compression load in the column 302 which may be laterally unsupported between the column upper end 308 and the column lower end 310 (FIG. 6).

Figure 8:
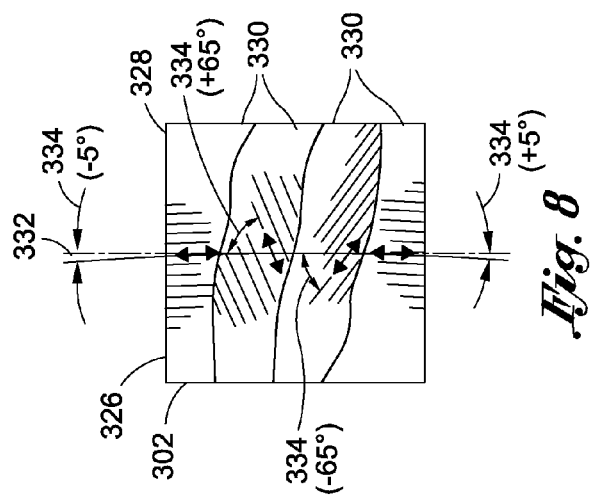
FIG. 8 is a schematic view of a portion of a column comprised of composite plies having fibers oriented at a fiber angle that is non-parallel to a column axis of the column.

Referring to FIG. 8, in a configuration, each column 302 may be formed as a composite laminate 328 comprising a plurality of composite plies 330 formed of the above-mentioned fiber-reinforced polymer matrix material. In a configuration, the composite plies 330 may be formed of relatively high-modulus graphite fibers in a polyimide resin matrix although the fiber-reinforced polymer matrix material may include carbon fibers, glass fibers, ceramic fibers, and/or other fibers types in a thermosetting or thermoplastic resin matrix such as epoxy resin, polyimide resin, or other resin material. The fiber-reinforced polymer matrix material may include graphite fibers that may have a Young's modulus of up to approximately $40 \times 10^6$ pounds per square inch (psi) or higher, and which may provide a relatively high compressive strength to the columns 302. The relatively high compressive strength of the columns 302 may allow for a relatively small column width 322 or column diameter. The relatively small column width 322 or column diameter may minimize the impact of the columns 302 on a preferred seating arrangement for the passenger seats 150.

Figure 10:
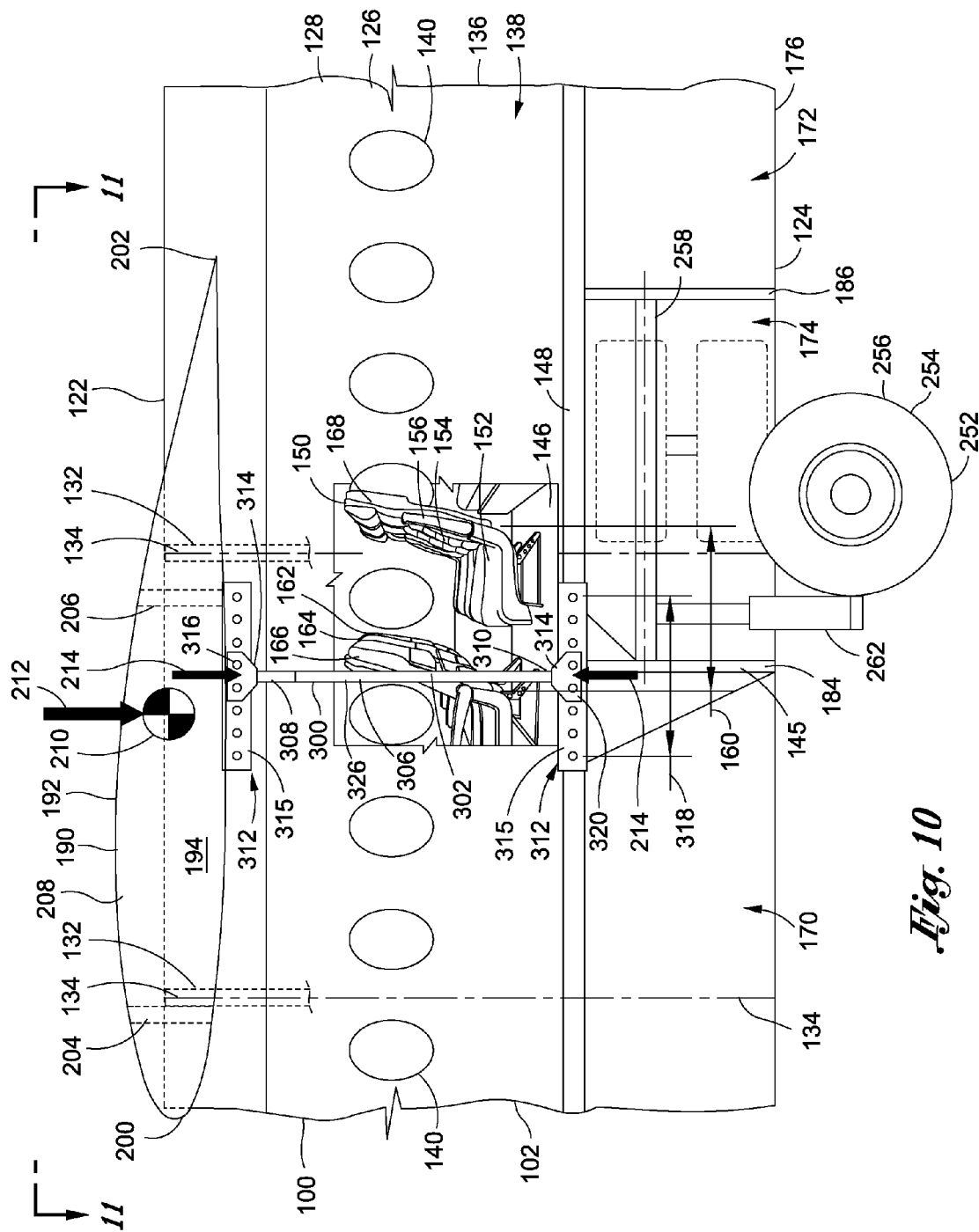
FIG. 10 is a side schematic view of a portion of a fuselage wherein the wing is supported by a plurality of columns positioned proximate a vertical center of gravity of the wings.

For example, the approximate width of the columns 302 may be roughly determined using a simple, generic, composite column-sizing process wherein a high-wing aircraft 100 may have a total wing mass of 70,000 pounds including the mass of the wing structure, the propulsion units 120, the fuel, and other wing-mounted systems. For a positive vertical fuselage acceleration of 3 g's and an applied safety factor of 1.5, the wing downward load 212 is approximately 300,000 pounds. For a structural support assembly 300 comprising a pair of aft columns 306 (i.e., no forward columns) as shown in FIG. 10, the primary compressive load in each one of the aft columns 306 is approximately 150,000 pounds. By forming each column 302 from fiber-reinforced polyimide matrix material containing high-modulus graphite fibers having a modulus of approximately $46 \times 10^6$ psi, and assuming that none of the wing downward load 212 is supported by the fuselage 102, each column 302 may conservatively be provided in a relatively small column width 322 (FIG. 7) of approximately 2.5 inches. Covering each column 302 with a 0.5 inch-thick layer of padding 336 (FIG. 7) would increase the overall column width 322 to approximately 3.5 inches which advantageously would have a minimal impact on the usable space for passengers seated in the row where the columns 302 are located. The use of four (4) columns (i.e., a pair of forward columns 304 combined with the pair of aft columns 306) would further reduce the individual compressive load and the required column diameter 322 or column width (e.g., for a rectangular column) of each column 302.

Referring to FIG. 8, the compressive strength of the columns 302 formed of fiber-reinforced polymer matrix material may be increased by configuring the composite plies 330 in a non-traditional layup wherein a relatively large portion (e.g., approximately 50-100 percent) of the composite plies 330 may have axial fibers with a fiber axis that is oriented generally non-parallel to the column axis 332 but within approximately 10 degrees of the column axis 332 to provide axial stiffness with inherent compression-splitting resistance. In a non-limiting example, FIG. 8 illustrates a stackup of four (4) composite plies 330 of a non-traditional multi-ply composite laminate 328 of a column 302 wherein the composite plies 330 have off-axis fiber angles 334 oriented non-parallel (i.e., at a non-zero angle and at a non-perpendicular angle) relative to the column axis 332. In this regard, the four (4) composite plies 330 have fiber angles 334 of +5°, −65°, +65°, and −5°. The fiber angle 334 pattern or stacking sequence may be repeated throughout the multi-ply composite laminate 328 although the stacking sequence may include alternative fiber angles 334.

Figure 9:
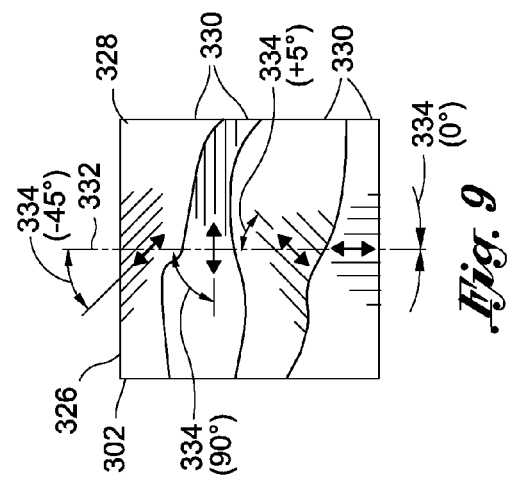
FIG. 9 is a schematic view of a configuration of a conventional composite layup and illustrating a composite ply of the conventional composite layup having fibers oriented at a fiber angle that is generally parallel (i.e., 0° fiber angle) to the column axis.

Advantageously, by using a non-traditional composite layup in FIG. 8 which minimizes or avoids fiber angles 334 that are generally uniformly parallel to the column axis 332, the composite laminate 328 in FIG. 8 may have increased resistance to intralaminar and/or interlaminar longitudinal (i.e., parallel to the column axis 332) compression-splitting or crack growth under compressive loading relative to a traditional layup in FIG. 9 having composite plies 330 with traditional fiber angles 334 of primarily 0° for stiffness, and with fewer bias 45° and 90° plies relative to the column axis 332, and which may have a reduced resistance to longitudinal splitting of the composite laminate 328 under compressive loading. FIG. 9 illustrates a layup of a portion of a composite laminate 328 having four (4) composite plies 330 with traditional fiber angles 334 of 0°, +45°, 90°, and −45°. Although FIG. 9 illustrates the composite laminate 328 having one composite ply 330 with a 0° fiber angle relative to the column axis 332, the composite laminate 328 may be comprised of primarily 0° composite plies 330 for stiffness. Such traditional fiber angles 334 may provide relatively low resistance to longitudinal (i.e., parallel to the column axis 332) splitting or crack propagation under compressive loading, or if the composite plies 330 are configured to resist splitting with a significant portion of the composite plies 330 being bias plies (e.g., +/−45° plies), the composite laminate may contain an insufficient percentage of 0° plies for column buckling stiffness. In a configuration not shown, one or more of the columns 302 may also be formed as a hybrid metal-composite laminate comprising one or more relatively thin, metallic (e.g., titanium) layers adhesively-bonded to fiber-reinforced polymer matrix material.

FIG. 10 is a side view of a fuselage 102 with the wing supported by aft columns 306 shown positioned aft of the vertical center of gravity 210 of the wings 190 and forward of the rear spar 206 of the center wing box structure 194. In addition, the fuselage 102 may be configured such that the front spar 204 and the rear spar 206 may be coupled to one or more of the fuselage frames 132 which may extend around the circumference of the fuselage 102 as indicated by the fuselage frame centerlines 134. Although not shown, forward columns 304 may be included to transfer a portion of the wing downward load 212 into the cargo bay sidewalls 188 via the secondary compression load 216 carried by the forward columns 304. In addition, the forward columns 304 may transfer a forward-acting moment (e.g., counter-clockwise about the vertical center of gravity 210) of the wing mass into the fuselage 102.

In FIG. 10, a configuration of the structural support assembly 300 may include an adjustment assembly 312 to enable forward-aft adjustment of the position of the columns 302 if a requirement exists to match or align the columns 302 with passenger seat 150 locations. In a configuration, one of the adjustment assemblies 312 may comprise an adjustment fitting 314 mounted to the column upper end 308 and an adjustment fitting 314 mounted to the column lower end 310. Each one of the adjustment fittings 314 may be mechanically coupled to an adjustment track 315 such as by means of one or more mechanical fasteners 316. The adjustment track 315 at the column upper end 308 may be mounted to the front spar 204, the rear spar 206, and/or the structural rib(s) 208 of the center wing box structure 194. The adjustment track 315 at the column lower end 310 may be mounted to the floor substructure 145 such as to the cargo bay sidewalls 188 (FIG. 6), the floor beams 148 (FIG. 6), or to other fuselage structure.

In a configuration, the adjustment fitting 314 at the column upper end 308 and at the column lower end 310 may provide a local adjustment range 318 for the forward-aft position of the columns 302 to accommodate variations in airline seat pitch 160 between the passenger seats 150. For example, each adjustment assembly 312 may be configured to provide approximately +/−15 inches of forward and aft movement of the aft column 306. As shown in FIG. 10, the adjustment assembly 312 may allow for positioning of the aft columns 306 at a location that is forward of the wheel well 174 forward bulkhead 184. Stabilizing elements (not shown) may be included in the floor substructure 145 to support the adjustment track 315 at the column lower end 310 and assist in transferring the primary compression load 214 of the aft columns 306 into the wheel well 174 forward bulkhead 184. Advantageously, the adjustment assemblies 312 may facilitate different passenger seat 150 locations for different airlines with minimal weight increase, minimal impact on the usable volume of the forward cargo bay 170, and minimal impact on the usable volume of the wheel well 174.

Figure 11:
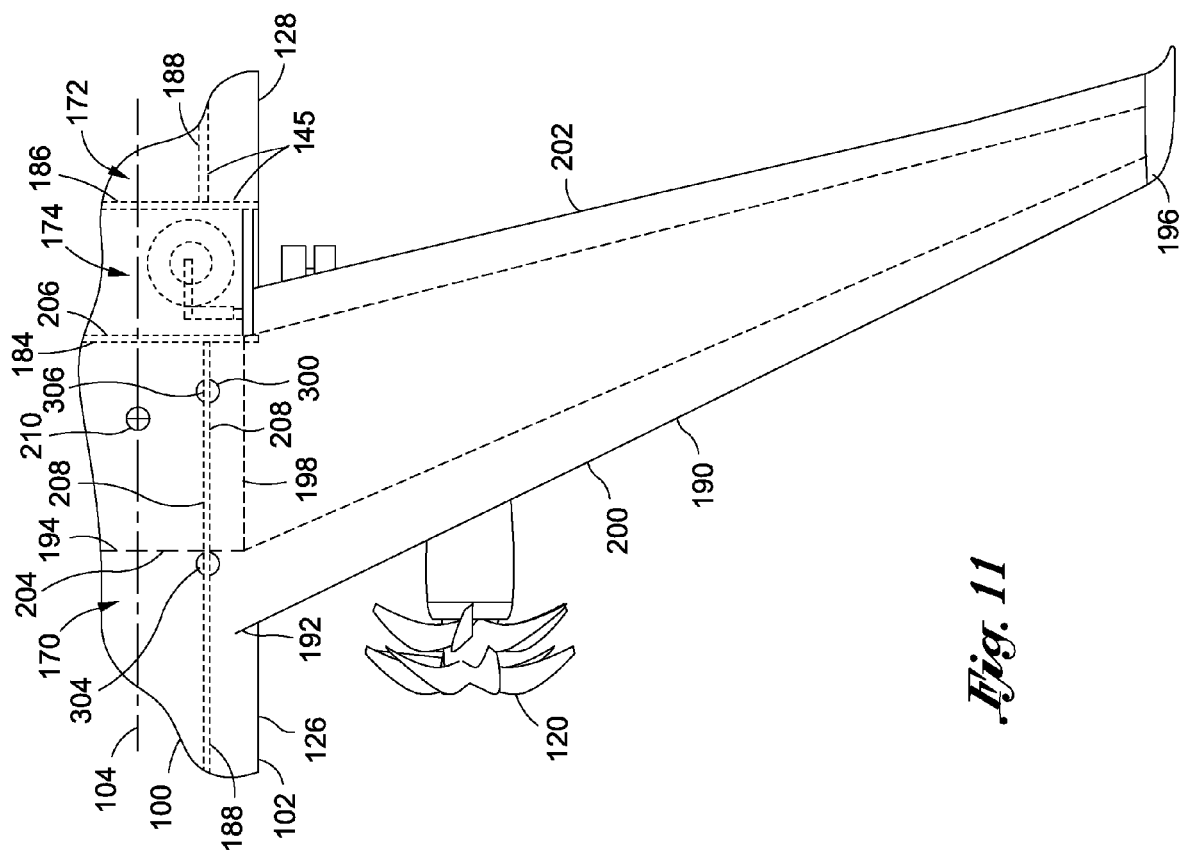
FIG. 11 is a top view of a configuration of a high-wing aircraft and illustrating the positions of the columns relative to the center wing box structure and the wheel well forward bulkhead.

Referring to FIG. 11, shown is a configuration of a high-wing aircraft 100 illustrating a portion of the structural support assembly 300 for supporting the wing during a positive vertical acceleration of the aircraft 100 such as during a hard landing. FIG. 11 illustrates the location of the vertical center of gravity 210 of the wing for a swept-wing platform and the relative positions of the forward columns 304 and the aft columns 306. As indicated above, for a non-swept-wing platform (not shown), the vertical center of gravity 210 of the wings 190 may be located generally midway between the front spar 204 and the rear spar 206 such that the wing downward load 212 (FIG. 10) may be generally uniformly distributed between the forward columns 304 and the aft columns 306. For a swept wing platform as shown in FIG. 11, the vertical center of gravity 210 may be located adjacent to the rear spar 206 of the center wing box structure 194, such that a single pair of aft columns 306 (i.e., an aft column 306 on each side of the aircraft 100 longitudinal axis 104) at or adjacent to the rear spar 206 may carry a majority of the wing downward load 212, and wherein the fuselage 102 may stabilize or support the above-mentioned moment load (not shown) due to the wing mass without the need for a pair of forward columns to support such moment load.

The aft column 306 is shown positioned longitudinally between the vertical center of gravity 210 and the wheel well 174 forward bulkhead 184. The aft column 306 may be laterally positioned in general alignment with the cargo bay sidewall 188 for shearing the primary compression load 214 (FIG. 10) of the aft column 306 into the wheel well 174 forward bulkhead 184. The forward column 304 may also be positioned in general alignment with the cargo bay sidewall 188 for shearing the secondary compression load 216 (FIG. 10) of the forward column 304 into the wheel well 174 forward bulkhead 184. The forward column 304 may also be generally aligned with the front spar 204 of the center wing box structure 194.

Figure 12:
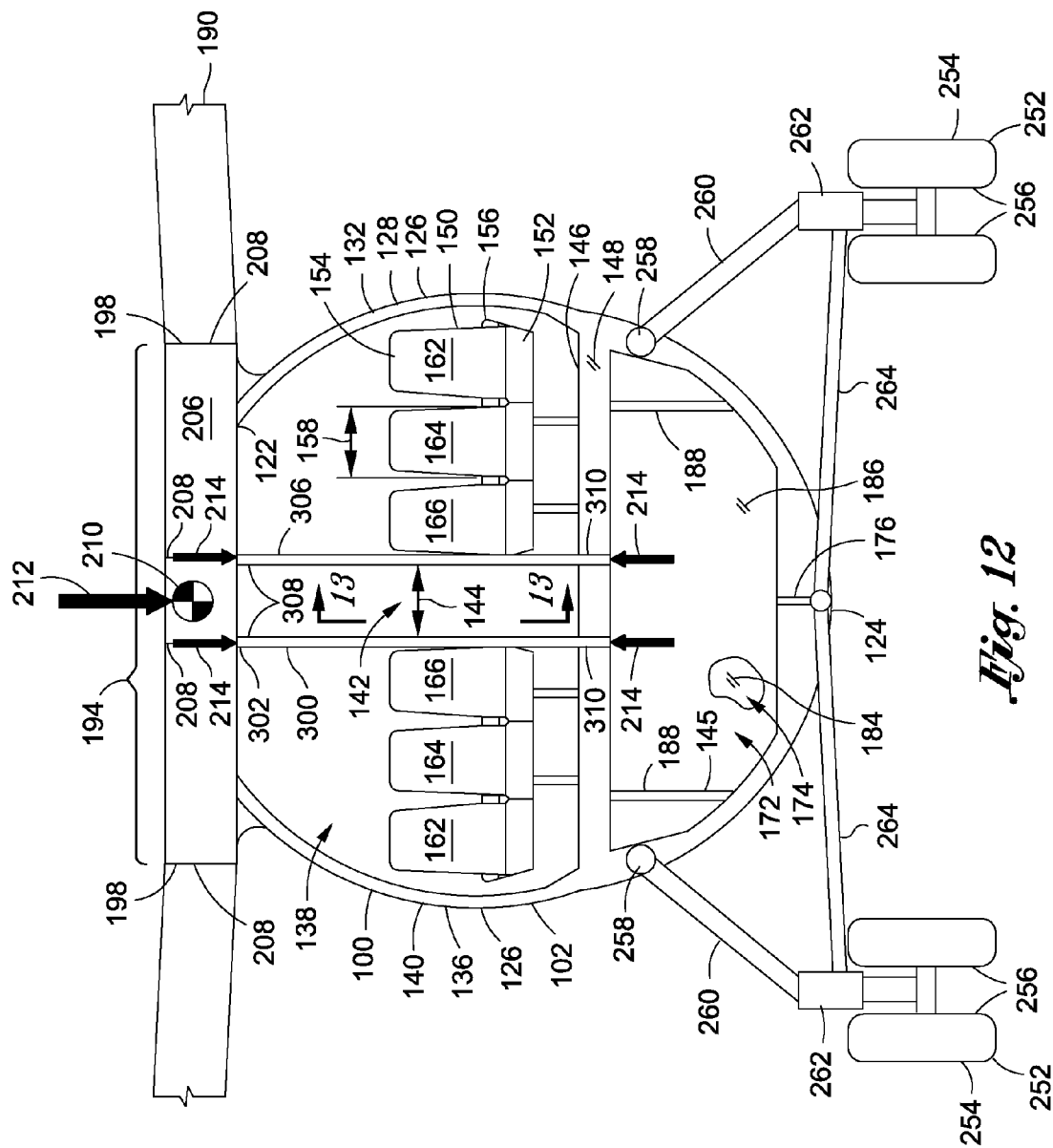
FIG. 12 is a sectional view of a configuration of a high-wing aircraft having a single-aisle passenger compartment and illustrating a pair of columns positioned on an aisle side of the aisle seats.
Figure 13:
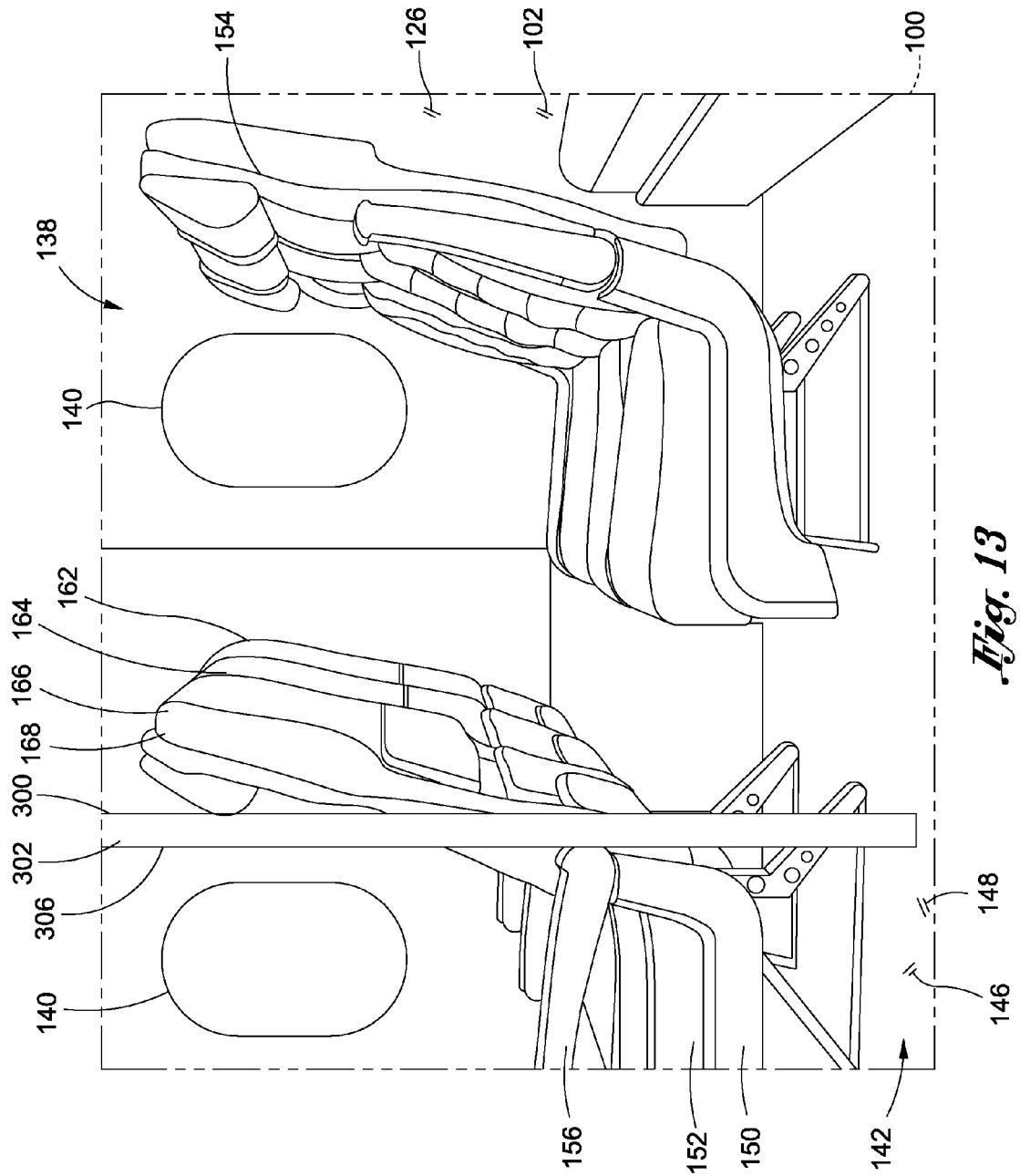
FIG. 13 is a side view of the passenger compartment of FIG. 12 and illustrating the position of the columns relative to the passenger seats.

FIGS. 12-13 show an alternative arrangement of the structural support assembly 300 for a single-aisle, high-wing aircraft 100. In FIGS. 12-13, the aft columns 306 and/or the forward columns 304 may be positioned on the aisle side 168 of the aisle seats 166. To accommodate the columns 302, one or more of the passenger seats 150 in the row where the column 302 is located may have a reduced seat width 158 (FIG. 12) relative to the seat width 158 of the passenger seats 150 in the non-column rows. Alternatively, the passenger seats 150 in the row with the column 302 may have the same seat width 158 relative to the seat width 158 of the passenger seats 150 in the non-column rows, and the aisle width 144 (FIG. 12) may be locally defined by the space between the columns 302. The aisle width 144 may be locally reduced to accommodate the columns 302 while maintaining a minimum aisle width 144 as may be required by the Federal Aviation Administration (FAA), the European Aviation Safety Agency (EASA), or other aviation regulatory body.

In FIG. 12, the aft column lower end 310 may be coupled to one or more of the floor beams 148. The floor beams 148 may transfer the load from the columns 302 into the cargo bay sidewalls 188 which may shear the load into the wheel well 174 forward bulkhead 184 and the main landing gear 252. As indicated above, the fuselage frames 132 may also transfer some of the wing downward load 212 into the main landing gear 252. FIG. 12 also illustrates an alternative arrangement for the main landing gear 252 which includes a side brace 264 that may be coupled to the keel region 124 of the fuselage 102.

Figure 14:
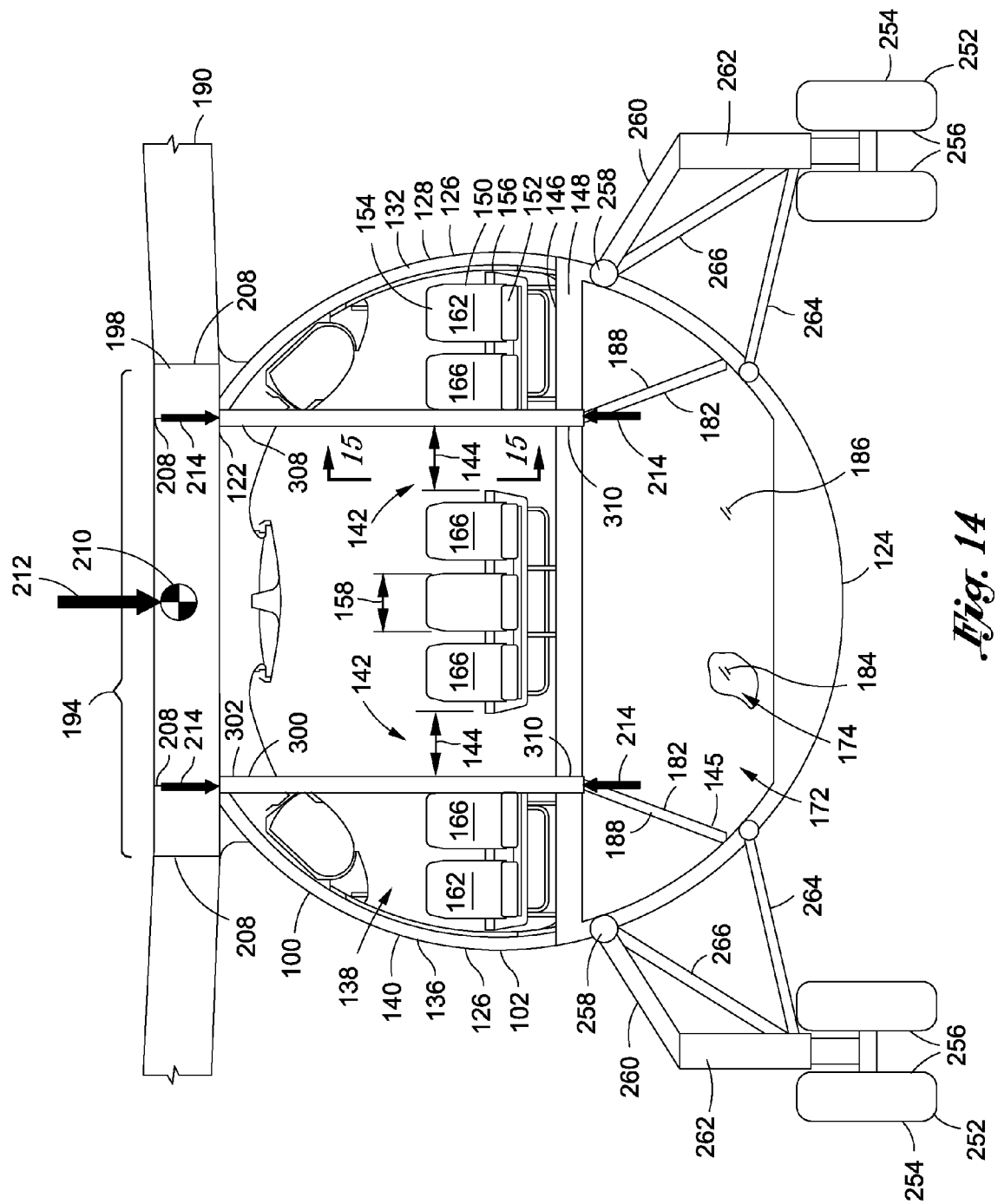
FIG. 14 is a sectional view of a configuration of a high-wing aircraft having a twin-aisle passenger compartment and illustrating a pair of columns positioned on the aisle sides of the aisle seats.
Figure 15:
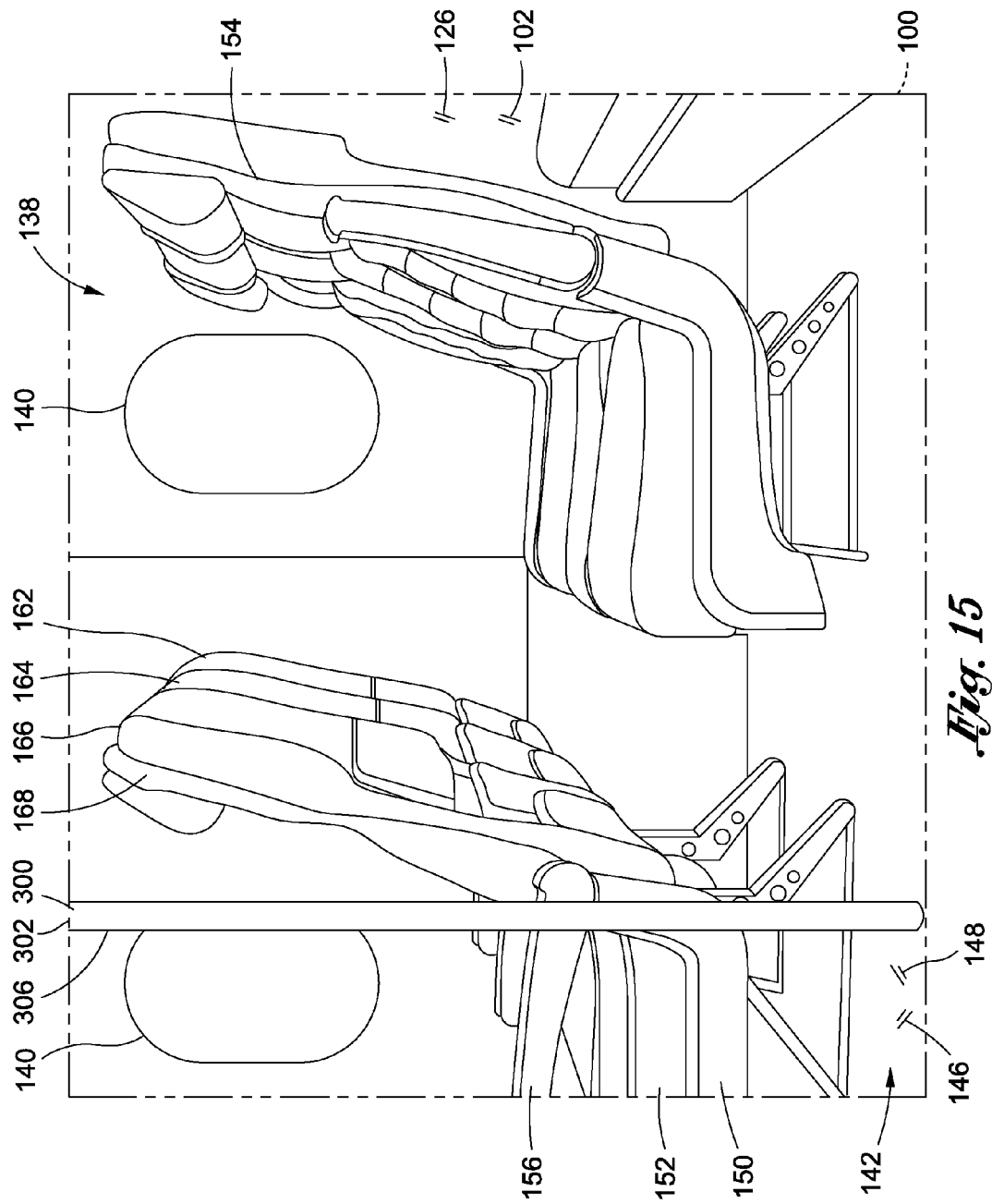
FIG. 15 is a side view of the passenger compartment of FIG. 14 and illustrating the position of the columns relative to the passenger seats.

FIGS. 14-15 show an arrangement of the structural support assembly 300 for a twin-aisle, high-wing aircraft 100. In FIGS. 14-15, the aft columns 306 and/or the forward columns 304 are positioned on the aisle side 168 (FIG. 10) of the outboard passenger seats 150. One or more of the passenger seats 150 may have a reduced seat width 158 to provide space for the columns 302 such that the aisle 142 may be maintained at a constant aisle width 144. Alternatively, the passenger seats 150 may be maintained at the same seat width 158 as the remaining passenger seats 150 in the passenger compartment 138 and the aisle width 144 may be locally reduced due to the columns 302. The column lower end 310 of the respective aft columns 306 and forward columns 304 may be coupled to the floor beams 148. The fuselage 102 may include auxiliary stanchions 182 that may be oriented at an angle (i.e. non-parallel to the columns 302) and may intersect the column lower ends 310 and transfer the compression loads of the columns 302 into the main landing gear 252 attach points as shown.

Figure 16:
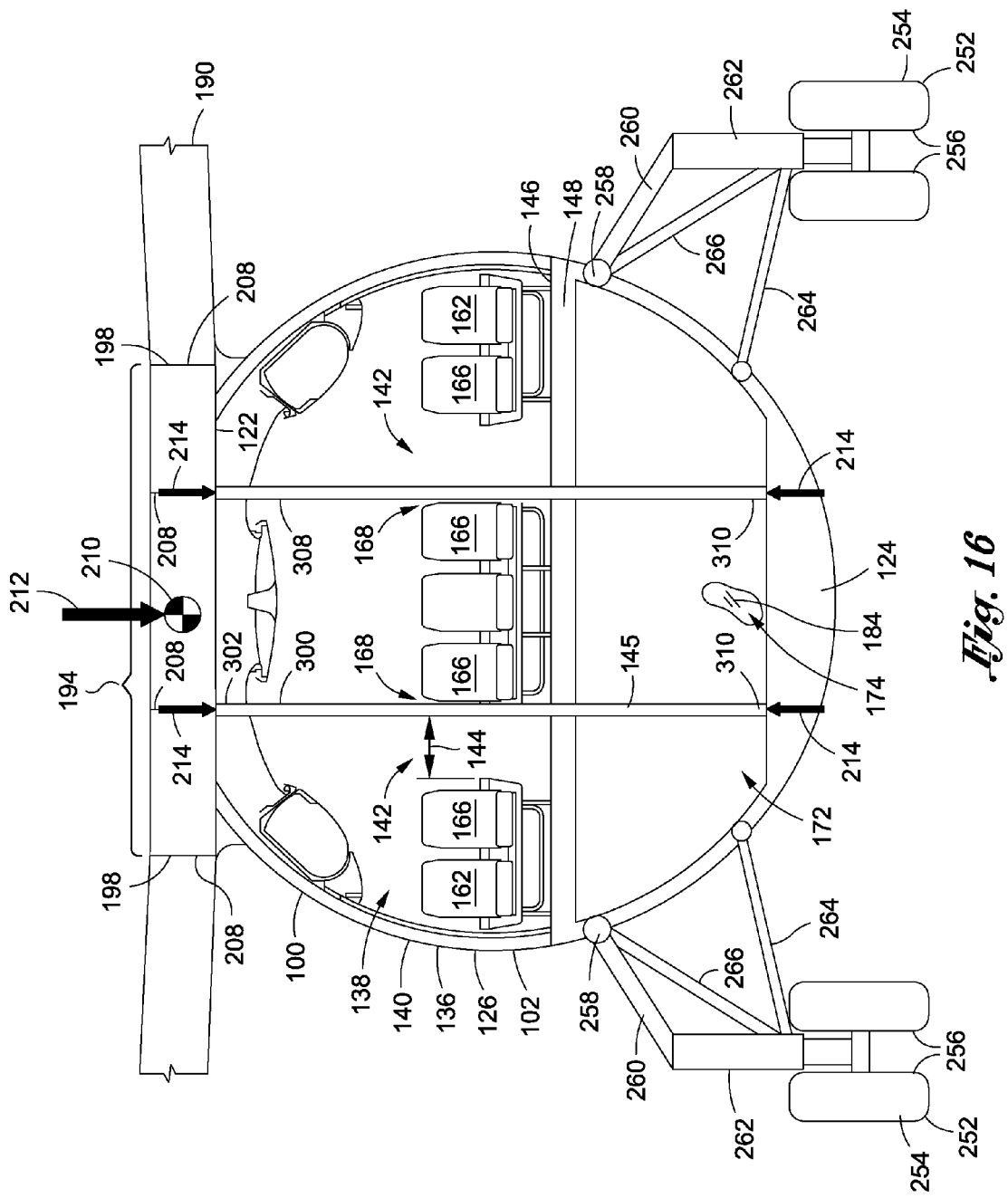
FIG. 16 is a sectional view of a further configuration of a twin-aisle passenger compartment and illustrating a pair of columns extending into the wheel well.

FIG. 16 shows an alternative arrangement of the structural support assembly 300 for a twin-aisle, high-wing aircraft 100 wherein the aft columns 306 (FIG. 6) and/or the forward columns 304 (FIG. 6) are positioned on the aisle side 168 of the center set of passenger seats 150. One or more of the columns 302 may extend down to the keel region 124 of the fuselage 102. For example, depending on available space, one or more of the columns 302 may extend into the wheel well 174 and may be coupled to the keel region 124 and/or the keel beam 176 (FIG. 12) of the fuselage 102.

Figure 17:
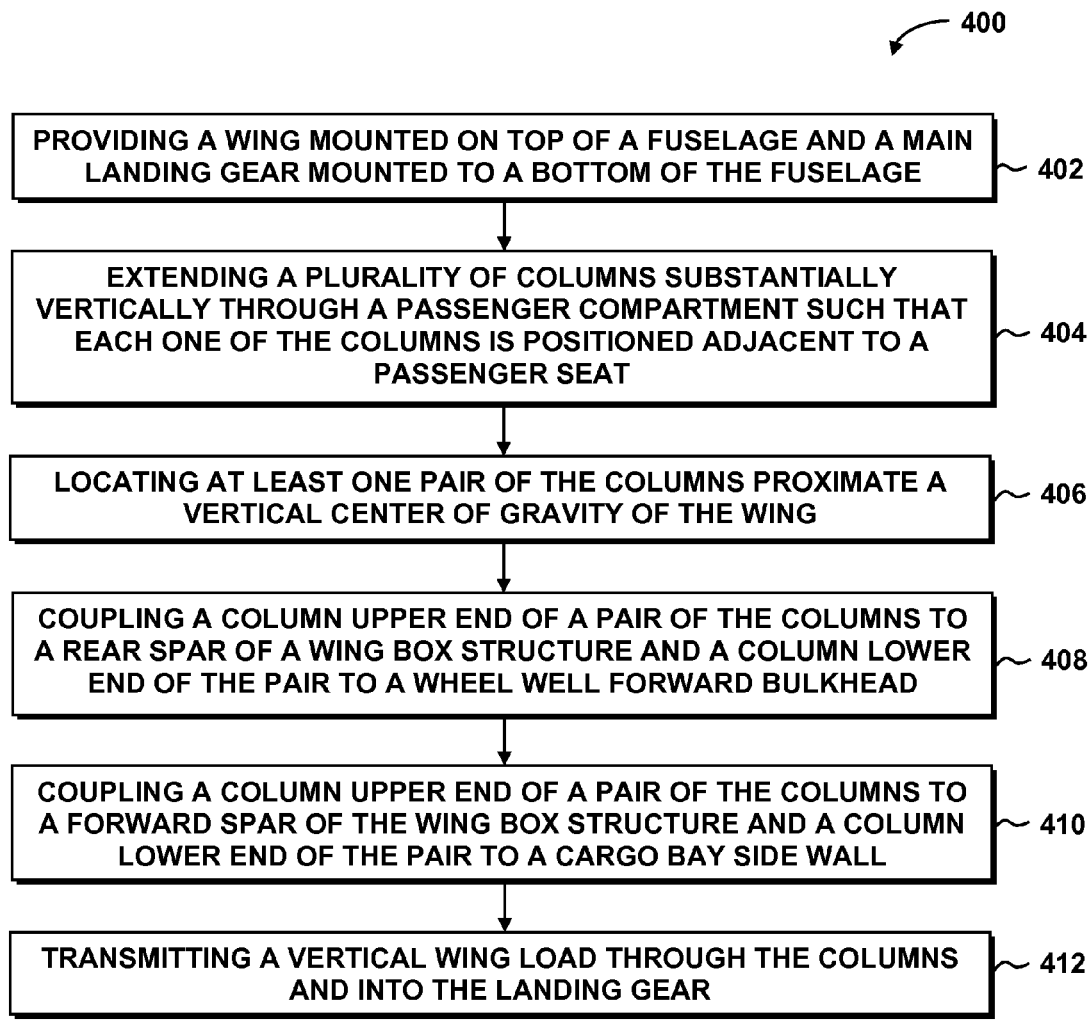
FIG. 17 is a flowchart having one or more operations that may be included in a method of supporting a wing on a fuselage of a high-wing aircraft.

Referring to FIG. 17, shown is a method 400 of supporting the wings 190 of a high-wing aircraft 100 using a structural support assembly 300 as shown in FIG. 10. The method 400 may include Step 402 which may comprise providing wings 190 mounted proximate a top of a fuselage 102 and a main landing gear 252 mounted to the bottom of the fuselage 102. In a configuration, the fuselage 102 may have an approximately circular cross-sectional shape 136. However, the structural support assembly 300 may be implemented in a fuselage 102 of any cross-sectional shape. Furthermore, the structural support assembly 300 may be implemented in a single-aisle passenger aircraft (FIGS. 4-12), in a twin-aisle passenger aircraft (FIGS. 14-16), or in a cargo aircraft or any other aircraft configuration.

Step 404 of the method 400 of FIG. 17 may include extending a plurality of columns 302 of the structural support assembly 300 through the passenger compartment 138 (FIG. 13) such that each one of the columns 302 (FIG. 13) is positioned adjacent to a passenger seat 150 (FIG. 13). In a configuration, one or more of the columns 302 may be substantially vertically oriented although the columns 302 may be provided in any angular orientation. In a configuration, the columns 302 may be generally aligned with the seat backs 154 (FIG. 13) of the passenger seats 150. The columns 302 may be positioned behind an arm rest 156 (FIG. 13) of a passenger seat 150 or in any location adjacent to one or more passenger seats 150.

The method 400 may include forming at least one of the columns 302 of composite material 326. For example, as mentioned above, one or more of the columns 302 (FIG. 7) may be formed of fiber-reinforced polymer matrix material. The composite material 326 (FIG. 7) may comprise composite plies 330 (FIG. 7) that may be formed of relatively high-modulus graphite fibers in a polyimide resin matrix. The compressive strength of the columns 302 may be increased by arranging the composite plies 330 in a non-traditional layup which may include configuring the composite plies 330 such that the fiber axes are oriented non-parallel to the column axis 332. The method may also include encapsulating at least a portion of at least one of the columns 302 with padding 336 (FIG. 7) to provide protection for passengers.

Step 406 of the method 400 of FIG. 17 may include locating a pair of the aft columns 306 (FIG. 10) proximate a vertical center of gravity 210 (FIG. 10) of the wings 190 (FIG. 10). For example, the forward-aft location of a pair of the aft columns 306 may be positioned generally aft of the vertical center of gravity 210 of the wings 190 such as between the vertical center of gravity 210 and the rear spar 206 (FIG. 10) of the center wing box structure 194 (FIG. 10). In a configuration, one or more of the columns 302 may be coupled to one or more structural ribs 208 in addition to or as an alternative to coupling the aft columns 306 to the rear spar 206 of the center wing box structure 194.

Step 408 of the method 400 of FIG. 17 may include coupling the column upper end 308 of the aft columns 306 to the rear spar 206 of the center wing box structure 194 and coupling the column lower end 310 of the aft columns 306 to the floor substructure 145 such as to the wheel well 174 forward bulkhead 184 as shown in FIG. 10. In this regard, the method 400 may include locating at least one of the columns 302 in generally vertical alignment with the wheel well 174 forward bulkhead 184 and coupling the columns 302 to the forward bulkhead 184. However, the structural support assembly 300 may include adjusting the forward-aft position 320 of the aft columns 306 to accommodate variation in seat pitch 160 (FIG. 10) such that the aft columns 306 may be non-aligned with the wheel well 174 forward bulkhead 184.

Step 410 of the method 400 of FIG. 17 may include coupling a column upper end 308 of a pair of forward columns 304 to a front spar 204 of the of the center wing box structure 194 as shown in FIG. 6. The method 400 may also include coupling a column lower end 310 of the forward columns 304 to the floor substructure 145 such as to the cargo bay sidewalls 188 as shown in FIG. 6. Although not shown, the forward columns 304 and/or the aft columns 306 may be provided with an adjustment assembly 312 as shown in FIG. 10 to facilitate adjusting a forward-aft position 320 of at least one of the columns 302. The adjustment assembly 312 may facilitate the forward-aft adjustment of the position of the forward columns 304 to correspond to the seat pitch 160 of the passenger seats 150.

Step 412 of the method 400 of FIG. 17 may include transmitting the wing downward load 212 through the columns 302 and into the main landing gear 252. As indicated above, the primary compression load 214 (FIG. 12) may be transmitted through the aft columns 306 and into the wheel well 174 forward bulkhead 184 (FIG. 12) which may then transfer the load into the trunnion 258 of each truck assembly 254 of the main landing gear 252 (FIG. 12). The secondary compression load 216 may be transmitted through the forward columns 304 and into the floor substructure 145 such as into the cargo bay sidewalls 188 which may then shear the secondary compression load 216 into the wheel well 174 forward bulkhead 184 for transfer into the trunnion 258 of each truck assembly 254 of the main landing gear 252.

Figure 18:
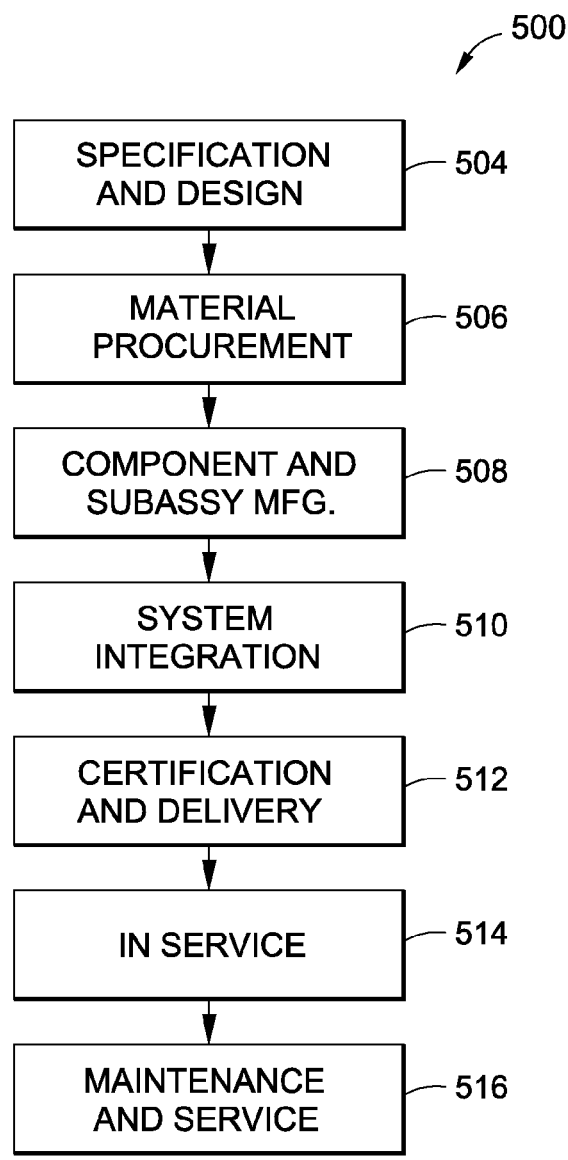
FIG. 18 is a flow diagram illustrating an aircraft manufacturing and service methodology.
Figure 19:
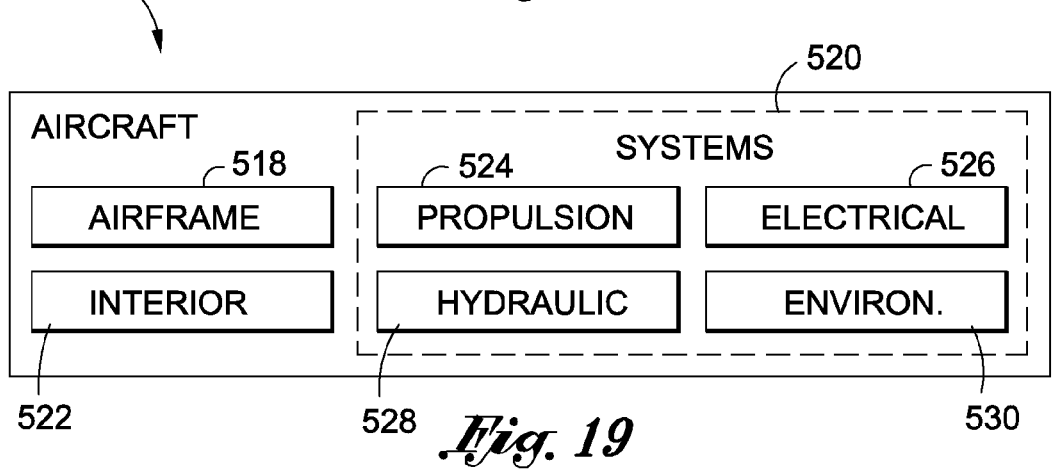
FIG. 19 is a block diagram of an aircraft.

Referring to FIGS. 18-19, configurations of the disclosure may be described in the context of an aircraft manufacturing and service method 500 as shown in FIG. 18 and an aircraft 502 as shown in FIG. 19. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of exemplary method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 19, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the disclosure may be applied to other industries, such as the automotive industry.

Apparatus and methods configured herein may be employed during any one or more of the processes of the aircraft manufacturing and service method 500. For example, components or subassemblies corresponding to production process 508 may be fabricated or manufactured in a manner similar to components or subassemblies produced while the aircraft 502 is in service 514. Also, one or more apparatus configurations, method configurations, or a combination thereof may be utilized during the production processes 508 and 510, for example, by substantially expediting assembly of or reducing the cost of an aircraft 502. Similarly, one or more of apparatus configurations, method configurations, or a combination thereof may be utilized while the aircraft 502 is in service, for example and without limitation, to maintenance and service 516.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A structural support assembly for a fuselage of a high-wing aircraft, comprising:
   at least one pair of columns on opposite sides of a longitudinal axis of a fuselage and extending through a passenger compartment of an aircraft having a pair of wings mounted proximate a top of the fuselage;
   a column upper end of at least one of the columns being coupled to a center wing box structure proximate a rear spar thereof;
   a column lower end of at least one of the columns being coupled to a floor substructure of the fuselage; and
   the at least one pair of the columns on opposite sides of the longitudinal axis transferring a wing downward load from the top of the fuselage into a respective main landing gear on each side of the fuselage.

2. The structural support assembly of claim 1, wherein at least one pair of the plurality of columns is located proximate a vertical center of gravity of the wings.

3. The structural support assembly of claim 1, wherein at least one of the plurality of columns is substantially vertically aligned with and being coupled to a wheel well forward bulkhead of the floor substructure.

4. The structural support assembly of claim 1, wherein at least one pair of the plurality of columns has column upper ends being coupled to the center wing box structure proximate a front spar thereof, and column lower ends being coupled to a cargo bay sidewall of the floor substructure.

5. The structural support assembly of claim 1, wherein at least one of the plurality of columns is positioned between a pair of adjacently-disposed passenger seats, one of the passenger seats being a window seat.

6. The structural support assembly of claim 1, wherein at least one of the plurality of columns is positioned on an aisle side of an aisle seat.

7. The structural support assembly of claim 1, further comprising an adjustment assembly enabling a forward-aft adjustment of at least one of the plurality of columns.

8. The structural support assembly of claim 1, wherein the fuselage has an approximately circular cross-sectional shape.

9. The structural support assembly of claim 1, wherein at least one of the plurality of columns is formed of a composite material.

10. The structural support assembly of claim 9, wherein:
the at least one of the plurality of columns has a column axis;
the composite material comprising a composite laminate formed of a plurality of composite plies; and
a majority of the composite plies in the composite laminate having a fiber axis oriented non-parallel to the column axis but within approximately 10 degrees of the column axis.

11. A structural support assembly for a fuselage of a high-wing aircraft, comprising:
at least one pair of columns one opposite sides of a longitudinal axis of a fuselage and extending substantially vertically through a passenger compartment of an aircraft having a pair of wings mounted proximate a top of the fuselage;
a column upper end of at least one of the columns being coupled to a center wing box structure adjacent to a rear spar thereof and proximate a vertical center of gravity of the wings;
a column lower end of at least one of the columns being coupled to a wheel well forward bulkhead;
at least one of the columns being positioned adjacent to a passenger seat; and
the at least one pair of the columns on opposite sides of the longitudinal axis transferring a wing downward load from the top of the fuselage into a respective main landing gear on each side of the fuselage.

12. A method of supporting a wing of a high-wing aircraft, comprising:
providing a fuselage having a wing mounted proximate a top of the fuselage and a main landing gear mounted to each side of the fuselage; and
extending at least one pair of columns on opposite sides of a longitudinal axis of the fuselage substantially vertically through an aircraft passenger compartment;
coupling a column upper end of the plurality of columns to a center wing box structure proximate a rear spar thereof;
coupling a column lower end of the plurality of columns to a floor substructure of the fuselage; and
transmitting a wing downward load through the at least one pair of the plurality of columns on opposite sides of a longitudinal axis of the fuselage and into the floor substructure and into the respective main landing gear on each side of the fuselage.

13. The method of claim 12, further comprising:
locating at least one pair of the plurality of columns proximate a vertical center of gravity of the wing.

14. The method of claim 12, further comprising:
locating at least one of the plurality of columns in a substantially vertical alignment with a wheel well forward bulkhead of the floor substructure.

15. The method of claim 12, further comprising:
coupling a column upper end of at least one pair of the plurality of columns to a front spar of the center wing box structure; and
coupling a column lower end of the at least one pair of the plurality of columns to a cargo bay sidewall of the floor substructure.

16. The method of claim 12, further comprising:
positioning at least one of the plurality of columns between a pair of passenger seats, one of the passenger seats being a window seat.

17. The method of claim 12, further comprising:
positioning at least one of the plurality of columns adjacent to an aisle side of an aisle seat.

18. The method of claim 12, further comprising:
adjusting a forward-aft position of at least one of the plurality of columns.

19. The method of claim 12, further comprising:
forming at least one of the plurality of columns from a composite material.

20. The method of claim 19, further comprising:
configuring the at least one of the plurality of columns such that a fiber axis of the composite material is oriented non-parallel to a column axis.

* * * * *